(12) United States Patent
Mitch et al.

(10) Patent No.: US 12,182,888 B2
(45) Date of Patent: Dec. 31, 2024

(54) SYSTEMS, DEVICES AND METHODS FOR TRACKING AUTHENTICATED CLEAN ENERGY WITH BLOCKCHAINS

(71) Applicant: Eleanor Mitch, Burlington, MA (US)

(72) Inventors: Eleanor Mitch, Houston, TX (US); Thomas Hardjono, Winchester, MA (US)

(73) Assignee: Safeflights, Inc.

( * ) Notice: Subject to any disclaimer, the term of this patent is extended or adjusted under 35 U.S.C. 154(b) by 55 days.

(21) Appl. No.: 17/918,110

(22) PCT Filed: Apr. 16, 2021

(86) PCT No.: PCT/US2021/027810
§ 371 (c)(1),
(2) Date: Oct. 10, 2022

(87) PCT Pub. No.: WO2021/212061
PCT Pub. Date: Oct. 21, 2021

(65) Prior Publication Data
US 2023/0134095 A1    May 4, 2023

Related U.S. Application Data

(60) Provisional application No. 63/094,335, filed on Oct. 20, 2020, provisional application No. 63/011,242, filed on Apr. 16, 2020.

(51) Int. Cl.
*G06Q 20/00* (2012.01)
*G06Q 20/38* (2012.01)
(Continued)

(52) U.S. Cl.
CPC ......... *G06Q 50/06* (2013.01); *G06Q 20/3829* (2013.01); *G06Q 20/389* (2013.01); *G06Q 40/04* (2013.01)

(58) Field of Classification Search
CPC ............... G06Q 50/06; G06Q 20/3829; G06Q 20/389; G06Q 40/04; G06Q 20/065;
(Continued)

(56) References Cited

FOREIGN PATENT DOCUMENTS

WO    WO-2012084524 A1 *  6/2012  ............... G01D 4/00

OTHER PUBLICATIONS

Foreign Reference Included (Year: 2012).*

* cited by examiner

*Primary Examiner* — Dante Ravetti
(74) *Attorney, Agent, or Firm* — Beckman Law P.C.; Christopher Beckman

(57) ABSTRACT

Systems, devices and methods for managing a preferred energy supply chain are provided. A system including a specialized hardware- and software-based control system with access to a network including one or more distributed ledger(s) authorizes one or more energy distribution entity(ies) to reserve future right(s) to preferred energy for distribution to customers using new forms of promissory tokens (e.g., reserved preferred energy tokens). The system includes a secure metering device with a crypto-processor, holding an asymmetric cryptography key pair associated with preferred energy production hardware. The device is physically attached or integrated with the production hardware, and exclusively holds a unique private key of the asymmetric cryptography key pair, while publishing only the public key of the key pair through the network. The system authenticates production of, and transactions in, clean energy using new forms of smart contracts between buyers and sellers, with the aid of a governance body.

19 Claims, 8 Drawing Sheets

(51) Int. Cl.
*G06Q 40/04* (2012.01)
*G06Q 50/06* (2012.01)

(58) Field of Classification Search
CPC ............. G06Q 20/0658; G06Q 20/145; G06Q 20/18; G06Q 20/38215; G06Q 20/02; G06Q 2220/00; Y04S 50/12; G07F 15/003; G07F 15/006
USPC .......................... 705/16, 21, 59; 380/44, 262
See application file for complete search history.

SYSTEMS, DEVICES AND METHODS FOR TRACKING AUTHENTICATED CLEAN ENERGY WITH BLOCKCHAINS

CROSS-REFERENCE TO RELATED APPLICATIONS

This application is a National Stage Application of PCT/US2021/027810, filed Apr. 16, 2021, which claims priority to U.S. Provisional Application Nos. 63/011,242, filed Apr. 16, 2020, titled "Systems, Devices and Methods for Managing a Preferred Energy Supply Chain," and 63/094,335, filed Oct. 20, 2021, titled "Systems, Devices and Methods for Tracking Authenticated Clean Energy with Blockchains," the disclosures of which are herein incorporated by reference in their entireties.

TECHNICAL FIELD

The present invention relates to energy and other resource management systems, and, more particularly, to devices, systems and methods for managing energy production and distribution using decentralized computer networks, such as blockchains.

BACKGROUND

Since the dawn of industrialized society, human use of energy resources has risen rapidly, along with World economic output. An increasing World population, implementing more powerful and sophisticated machines, performs a greater and greater amount of work. The management of energy resources has become more challenging in this environment. As with any other resource, energy is in limited supply. New sources of energy are continuously explored and developed in an attempt to meet the World's escalating energy demands.

Complex energy management systems have emerged, in an attempt to facilitate the distribution of energy to customers. For example, electrical power utility companies implement a "grid" system for delivering electricity to residential and industrial consumers, with the aid of complex computer hardware. In some instances, such grid systems assign varying prices for energy delivery, depending on the level of demand and resources available to meet that demand at particular times of day. For example, at times of "peak" energy demand (ordinarily, mid-day), grid systems typically provide power at increased prices (a.k.a. "rates") to consumers. Knowing this, consumers may consciously reduce their energy consumption, to the extent possible, at such times. Other consumers may even turn to alternative, off-grid energy sources, such as a generator, or back-up battery.

Recently, some energy consumers have begun creating their own sources of energy, to replace or supplement such electrical power drawn from energy grids. For example, some consumers now install solar power hardware, such as energy systems including photovoltaic panels, on the roofs of their buildings, which harvest electrical energy from sunlight. Quite suitably, these systems tend to produce peak electrical energy at or about the same times as peak energy demand (again, mid-day, when ambient sunlight is highest), serving to defray higher energy costs for the consumer. For consumers implementing such localized systems, some grid systems may even permit consumers to send their excess energy production at such times to the grid for other consumers' use, and receive a credit on their utility bill, sometimes using a "net metering" technique, in which a total amount of money due is billed to the consumer based on energy taken from the grid, offset by the amount of energy the consumer contributes to the grid, in a given energy usage period. However, as an alternative, some consumers may simply store energy at times of high energy production from sunlight, for example, using a battery pack.

In complex industrial manufacturing and maintenance processes, the availability and provision of resources is integrated with the field of enterprise resource management ("ERM"). Modern ERM requires the development of integrated approaches to managing core business processes, and the resources needed for them, including the provision of inventory, parts, maintenance services and completed products.

Despite the advancement of ERM, consumers typically have limited knowledge of the sources of energy delivered to them. Of course, consumers with their own source of energy, such as a home-based photovoltaic energy system, may know that some of their energy consumption is sourced from that system. But if a grid system delivers energy from another source, consumers generally have no knowledge of or control over the precise different sources, or percentage thereof, in the energy delivered to them.

There is still a need for more effective resource management systems, and Energy Resource Planning Systems ("ERPs") in particular, tailored to the dynamic needs of consumers and industries, incorporating ever-changing information and legal regulations, and yielding richer, more complete data regarding a wide variety of energy resource management factors.

It should be noted that some of the disclosures set forth as background, such as, but not limited to, the above language under the heading "Background," do not relate exclusively to prior art and the state of the art in the field(s) of the invention, and should not be construed as an admission with respect thereto.

SUMMARY

Systems, devices and methods for managing a plurality of energy resources, energy consumption, and related information in a complex economic environment are provided. According to some aspects of the invention, a specialized hardware- and software-based control system selectively manages energy resources and energy resource-related data with the aid of, and/or as a part of, an administrative system, such as an Enterprise Resource Planning system ("ERP"). In some embodiments, such a control system is included within, or includes, a device that assigns one or more relative priority levels to a plurality of sources of energy. For example, in some embodiments, a code signifying a higher priority is assigned to an energy source including a preferred type of energy (which energy source(s) are referred to herein as "preferred energy"), than a priority level coded for other, less-preferred types of energy. In some such embodiments, such preferred energy is a more environmentally-friendly type of energy (referred to herein as "green energy," "clean energy" or "soft energy"), than other types of energy available from other sources. (However, in other embodiments, preferred energy may another form of energy desired by consumers, even if less environmentally friendly (e.g., energy from coal) ("desired energy") as discussed in greater detail below).

In some embodiments, such a control system includes such an administrative system. In some embodiments, such a control system includes, or is in communication with, a distributed network (such as a decentralized blockchain(s))

which aids in such energy resources and energy resource-related data management. In some embodiments, such a control system includes one or more specialized devices, which aid in such energy resources and energy resource-related data management. In some embodiments, such an administrative system controls a supply chain including preferred energy source(s). In some such embodiments, such preferred energy is a more environmentally beneficial type of energy (referred to herein as "green energy," "clean energy" or "soft energy"), than other types of energy available from other sources. For example, in some embodiments, such a clean energy source may include a naturally occurring source of energy. In some such embodiments, such a clean energy source includes a solar energy source. In some embodiments, a clean energy source includes a wind energy source. In some embodiments, a clean energy source includes a moving water energy source. In some embodiments, such a distributed network includes a computer network. In some embodiments, such a distributed network includes a distributed ledger. In some embodiments, such a distributed network includes at least one blockchain(s). In some embodiments, such a distributed network includes a plurality of blockchains. In some such embodiments, any of the above such blockchain(s) includes at least one private blockchain(s), meaning that such a blockchain is accessible, viewable and/or editable by a limited number of identified, authorized and/or authenticated users. In some such embodiments, such a private blockchain is only so accessible, viewable and/or editable by authorized users (e.g., who have performed an authentication routine) with permission for such access, viewing and/or editing. In some such embodiments, such a plurality of blockchains includes at least one public blockchain, meaning that such a blockchain is accessible, viewable or editable by unlimited, or less limited, numbers of public users. In some embodiments including such a plurality of blockchains, at least one of the plurality of blockchains may have different software than at least one other of the plurality of blockchains. For example, in some embodiments, at least one of the plurality of blockchains may include software implementing different access, viewing and editing rules for users (e.g., implemented through different smart contracts and/or governance variables, as discussed in greater detail below) than at least one other of the plurality of blockchains. However, in some such embodiments, some of the same data is recorded and managed, (e.g., including an accurate factual record of events relevant to resource management, on each of the plurality of blockchains). In some such embodiments, the same data is so recorded and managed even though at least one of the plurality of blockchains includes different access, viewing and editing rules for users than at least one other of the plurality of blockchains. In some embodiments, substantially identical data, including a substantially identical such factual record, is recorded and managed on each of the plurality of blockchain(s). In some such embodiments, the substantially identical data is so recorded and managed even though at least one of the plurality of blockchains includes different access, viewing and editing rules for users than at least one other of the plurality of blockchain(s). In some embodiments, software, hardware and/or users maintain such same data or identical data across each of the plurality of blockchain(s) (in other words, the same data or identical data "bridges" across the plurality of blockchains). In some such embodiments, such bridging is immediately implemented, in real time, as new data is entered on any of the plurality of blockchains. For example, in some embodiments, at least one user and/or governance body (as discussed below) may have access, viewing and/or editing privileges to each of the plurality of blockchains, and may use such privileges to record and maintain such same data or identical data across such a plurality of blockchains. In some such embodiments, cross-chain or "blockchain-to-blockchain" interoperability, allowing data recorded on one of the plurality of blockchains to be recorded on others of the blockchains (and other hardware) is provided through such bridging.

However, in other embodiments, preferred energy may be another type(s) of energy desired by consumers, even if less environmentally beneficial in at least some respect than the examples of preferred energy listed immediately above (which type(s) of energy may be referred to as "desired energy" in this application). For example, in some embodiments, a preferred energy source may include a nuclear energy source, which may be such a desired energy source. In some embodiments, a preferred energy source includes a nuclear fusion-based energy source, which may also be such a desired energy source. In some embodiments, such a preferred energy source includes a nuclear fission-based energy source, which may be a desired energy source. As another example, in some embodiments, a preferred energy source includes a coal energy source, which may be a desired energy source. As another example, in some embodiments, a preferred energy source includes an oil-based energy source, which may be a desired energy source. In any embodiment set forth below where any aspects of the invention, such as energy transaction recording, are based on a classification or determination of energy as "preferred energy" or "clean energy," it should also be understood that such aspects may be applied and adapted to energy that is "desired energy," or other classifications of energy types, or vice versa, in additional, alternative embodiments, as will be apparent to those of ordinary skill in the art.

In some embodiments, such an administrative system and decentralized blockchain(s) control and record the issuance and trading of promissory tokens, or other types of token(s). In some such embodiments, the identity of traders participating in such trading, and the nature of such trading (e.g., whether they are verified as relating to preferred energy or clean energy), are visible to other users, through such blockchain(s). In some embodiments, software-based constraints may be implemented by the control system, which constraints may be based on such token(s). For example, in some embodiments, some of such traders or other users may be prevented by the control system, administrative system and/or blockchain(s) from selling or reselling such tokens, or from exercising other privileges through the control system, if data indicates that such tokens (and/or related transaction(s)) do not relate to clean energy. In some such embodiments, particular classes of energy buyers are so prevented, or otherwise constrained in activity by the control system, administrative system and/or blockchain(s). In some embodiments, smart contracts are implemented by the control system, administrative system and/or blockchain(s), to effectuate such constraints, and other energy and data management techniques set forth in this application. For example, in some embodiments, smart contracts are utilized to control and balance supply and demand for preferred energy. In some such embodiments, variables maintained by the control system are also utilized to control and balance supply and demand for preferred energy. In some such embodiments, such smart contracts and variables are also utilized to control and balance supply and demand for particular types of preferred energy (e.g., clean energy).

In various embodiments, new systems, devices and methods for enhancing information transparency for consumers, governments, citizens, users of the control system, administrative system and/or blockchain(s) ("users") and other interested parties with respect to preferred energy are provided. For example, in some embodiments, a device comprised within or comprising a specialized hardware- and software-based control system, such as any of the device(s) discussed in this application, produces and presents information related to a state of an energy supply chain to a user. For example, in some embodiments, one or more specialized Graphical User Interface(s) ("GUI(s)") is/are presented on display hardware conveying information related to such a state, among other things, to consumers of energy or other users of the GUI. Some examples of such GUIs are provided in FIGS. 12-16, as discussed below. In some such embodiments, such consumers and/or users include residents of a household. In some such embodiments, such consumers and/or users include a governing body(ies) and/or other government agent(s). In some such embodiments, such a governing body(ies) and/or other government agent(s) includes a consortium or other association of users (e.g., energy producers using the control system and blockchain(s)). As another example, in some embodiments, such a specialized GUI is presented on display hardware conveying information related to such a state to suppliers of energy. As another example, in some embodiments, such a specialized GUI is presented on display hardware conveying information related to state to governments or other communities, stakeholders or other parties interested in such a state. In some embodiments, such information related to a state includes data and/or information related to an amount of economic demand for energy. In some embodiments, such data and/or information related to such a state includes information related to an amount of demand for preferred energy. In some embodiments, such data and/or information related to such a state includes data and/or information related to an amount of demand for a particular type of preferred energy. As another example, in some embodiments, a specialized GUI is presented on display hardware conveying information related to verifying and/or authenticating information related to preferred energy sources of energy delivered to consumers or other users of the control system. For example, in some embodiments, a consumer or other buyer of preferred energy is provided with assurance(s) that such energy is sourced from a clean energy source (e.g., based on the control system verifying such sourcing). In some embodiments, the control system implements techniques for ensuring and/or validating that such information related to preferred energy sources of energy are accurately recorded (e.g., on a decentralized blockchain(s) ledger.) For example, in some embodiments, consumers or other buyers of preferred energy (e.g., clean energy) are assured of the authenticity of an allegedly "clean" energy source based on transactions recorded on a blockchain ledger. In some embodiments, analytics are performed on such a ledger to provide such an assurance, and a probability of fraudulent reporting is reported and/or recorded by the control system. In some such embodiments, such analytics and probability(ies) are validated by the control system.

In some embodiments, the control system provides additional or other forms of transparency-enhancing tool(s), which provide users with a list of one or more energy source indicator(s) relative to an offer, purchase or other transaction in energy, or a financial derivative thereof. In some embodiments, such a tool is provided within a GUI created by the control system. In some embodiments, such a purchase or financial derivative of energy is a contract. In some such embodiments, such a contract is a smart contract, and is executed and recorded through a transactional tool implemented by the control system. In some such embodiments, such a transactional tool includes a promissory note, between at least two contracting parties, and recorded by the control system. In some such embodiments, such a transactional tool includes a technique for issuing, signing, transmitting and recording (a.k.a. "issuing") a token, such as a "promissory token," and/or "Clean Energy Token," as will be set forth in greater detail below, executed with the aid of a decentralized network, included in, or including the control system. In some embodiments, such a token may record of, or be, a virtual asset, which may have a value determined by the control system. In some embodiments, tokens comprise a signed transaction data structure, recorded on a blockchain. In some such embodiments, such a decentralized network includes at least one blockchain. In some embodiments, such a decentralized network includes a plurality of blockchains. In some embodiments, such a promissory token includes restrictions on the reselling of energy related to the token, as managed by the control system. For example, in some embodiments, such a restriction prevents such reselling to buyers of particular classification(s), while permitting such reselling to other buyers. In some embodiments, such a specialized GUI presents a user with options for selling and/or buying such promissory token(s) for amounts of a particular fiat currency. In some embodiments, such a specialized GUI presents a user with options for purchasing such promissory token(s) for amounts of a monetary credit, recorded by the control system and/or a blockchain. In some embodiments, such a specialized GUI presents a user with options for purchasing such promissory token(s) for particular amounts of material goods (i.e., bartering). In any of the embodiments immediately above, set forth in this paragraph, the control system may set a current rate of exchange between the token and the other asset of value (e.g., fiat currency, monetary credit unit, material good, etc.) In some embodiments, the control system may lock in such a particular current rate of exchange (a "lock rate"), guaranteeing and applying it to transactions between users taking place through the control system, for a length of time. In some such embodiments, the specialized GUI may indicate such a current rate of exchange, and such a length of time (a "lock period"). For example, in some embodiments, the control system may provide a user with a lock rate for a lock period of 90 days and, within that 90 days, the user may execute a transaction of token(s) for the other asset(s) of value at that lock rate any time within that period. In some embodiments, the user may be required to pay for that lock rate and the lock period (i.e., an "Rate Option Price."). In some embodiments, such a Rate Option Price will increase, if a user selects a longer lock period, from a range of selectable options presented on the GUI.

In some embodiments, such a transactional tool records data related to an energy transaction. For example, in some such embodiments, the transactional tool creates and records data related to the delivery of energy to an energy recipient. In some embodiments, the transactional tool creates a record of data related to the receipt of energy by an energy recipient. In some embodiments, the transactional tool creates a record of data related to the consumption of energy by an energy recipient. In some embodiments, a transactional tool records other data, related to an energy transaction between at least one energy seller and at least one energy buyer. For example, in some embodiments, such a transactional tool records data regarding an amount of energy subject to such a transaction. As another example, in some embodiments, such a transactional tool records data regarding the identity of the energy buyer and/or the energy seller who are parties to such a transaction.

In some embodiments, energy-related smart contracts include a governance feature, and the control system implements an algorithm incorporating a plurality of variables related to the supply and demand for particular preferred types of energy.

As discussed elsewhere in this application, in some embodiments, tokens are issued by a control system including computer hardware and software connected to a network, such as the Internet and/or one or more blockchain(s), and carrying out any other aspects of the invention set forth in this application. In some such embodiments, one or more of such blockchain(s) are used to record energy-related transactions. In some embodiments, such tokens are issued by one or more user(s) of the control system with privileges to issue such promissory tokens. For example, in some embodiments, such users include sellers owning a secure metering device (an "SMD"), as discussed in greater detail below. As another example, in some embodiments, such users include regional and/or municipal distributor(s) of energy. As an example, in some embodiments, such users include regional and/or municipal distributor(s) of energy. In some such embodiments, one or more of such blockchain(s) are used to record energy-related transactions. For example, in some such embodiments, such a regional and/or municipal distributor(s) of energy may issue promissory tokens on such a blockchain, which tokens serve as a smart contract between such a regional and/or municipal distributor and another party (e.g., an end consumer) securing terms for the purchase of energy to be provided to such other party at a future time. For example, in some such embodiments, such an owner of an SMD is an owner of energy-producing hardware and may issue Clean Energy Tokens on such a blockchain, which tokens may support a smart contract between such an owner and/or a wholesale buyer and another party (e.g., an end consumer) securing terms for the purchase of energy. In some such embodiments, such a purchase of energy is a purchase of preferred energy. In some such instances, such promissory tokens may be visible, or at least partially visible, to any party participating in an energy supply chain providing such preferred energy. In some such embodiments, such a purchase of energy is a purchase of clean energy. In some such instances, such promissory tokens may be visible, or at least partially visible, to any party participating in an energy supply chain providing such clean energy.

In some embodiments, such a control system creates a digital signature based on data-bearing tag(s), which may be chemical, electromagnetic, visual-based or other tag(s) placed on, in or throughout an asset for use in a manufacturing, maintenance, conveyance, shipping, delivery, distribution, or another industrial process ("data-bearing tag"). A data-bearing tag is a label, identifier, tag, particle, or any other device that contains information about an asset. The control system then combines that information about an asset with the digital signature into a new, combined data set, and inserts all or at least part of that set into a secure network and/or a blockchain, as a series of recorded values. Preferably, an insertion process into a blockchain is used, which creates a secure, encrypted identifier, separate from the digital signature, which is associated with the asset. This process creates a new identifier, for use on the blockchain, unique to the particular asset, and allows a user to trace any asset recorded by the control system, view important data related to it, and authenticate it, in real time, and to better manage the asset throughout its lifecycle within the control system. The enhanced security of the blockchain-implemented embodiment protects the asset from hacking and other security threats, making the control system substantially inviolable.

In some embodiments, the invention is implemented as a comprehensive, all-inclusive control system, managing the entire energy source selection, energy procurement, distribution and transactional process (including the issuance of tokens, promissory tokens and presenting transactional tools).

In some embodiments, any of the energy sourcing, distribution, tracking, and related asset manufacturing, maintenance and/or tracking processes set forth in this application are carried out with the aid of an ERP or other administrative system, and may include both middleware, and, in some embodiments, software, and computer hardware running that middleware and/or software, directly interfacing with a user and manufacturing and/or maintenance computer hardware. However, aspects of the invention are not limited to ERP contexts.

Further aspects of the invention will be set forth in greater detail, below, with reference to the particular figures.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

The example embodiments of the invention presented herein are directed to methods, systems, devices and computer program products for managing and validating a plurality of disparate energy resources (including, but not limited to, preferred energy sources), energy consumption, and related information in a complex economic environment, which are now described herein. This description is not intended to limit the application of the example embodiments presented herein. In fact, after reading the following description, it will be apparent to one skilled in the relevant art(s) how to implement the following example embodiments in alternative embodiments (e.g., involving a control system including specialized computer hardware and software implementing GUI tools for managing preferred and other energy sources).

Figure 1:
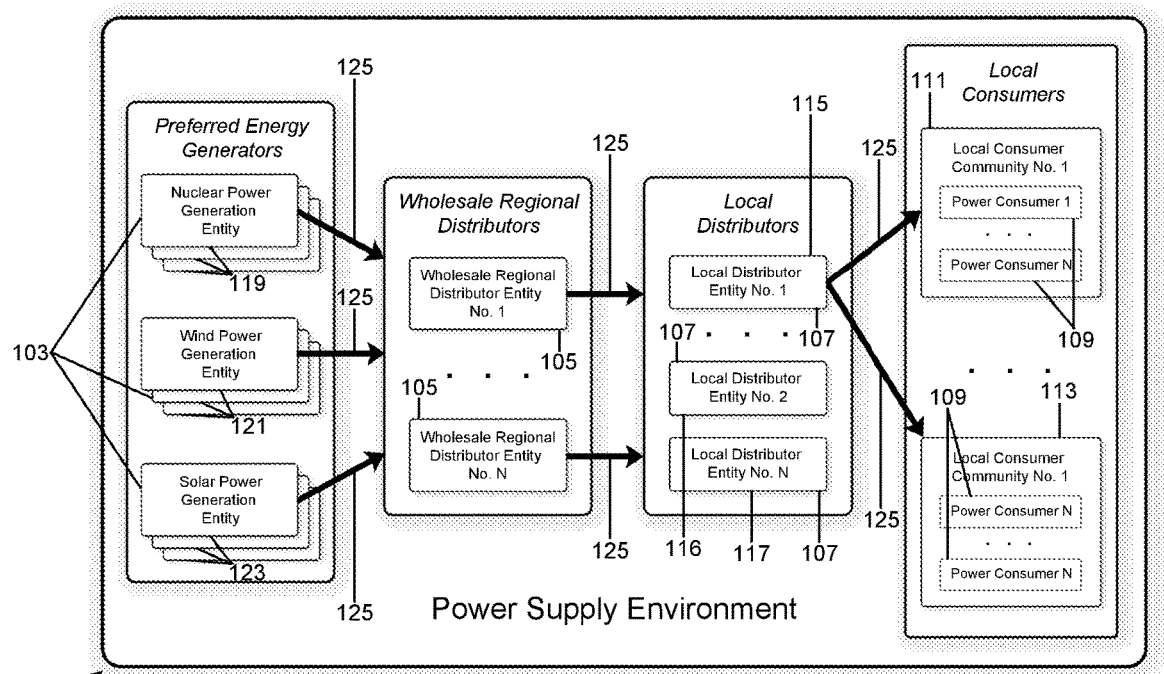
FIG. 1 is an example diagram of elements of an energy sourcing and distribution supply chain environment, in which systems, devices and methods in accordance with aspects of the present invention may be implemented.

FIG. 1 is an example diagram of elements of an energy sourcing and distribution supply chain environment 100, in which systems, devices and methods in accordance with aspects of the present invention may be implemented. As discussed above, in some embodiments, energy transactions and distribution are managed by a control system, including computer hardware and software, connected to a network, such as the Internet and/or one or more blockchain(s), and carrying out any other aspects of the invention set forth in this application. For example, in some embodiments, promissory tokens are issued by the control system and/or user(s), and recorded on a blockchain, to govern the provision of preferred energy at a future time. In some embodiments, such a control system, which may be a control system as that set forth with reference to FIG. 2, below, may be included within energy sourcing and distribution environment 100. In some embodiments, such a control system may be at least partially present on the premises of any entity or individual using the control, system (a "user"). As an overview, some such possible entities or individuals, according to some embodiments, may include any of the following: A) energy generating parties, such as the pictured example preferred energy generation entities 103; B) wholesale or other early intermediate energy distributor entities, such as example wholesale regional distributor entities 105; C) other distributors of such energy, such as example local distributor entities 107; and/or consumers of such energy, such as example local consumers 109. As used in this application, "entities" means any business, government or other recognized party with the ability to act as a party to a business transaction, and/or to act upon its legal or other rights.

In some embodiments, such promissory tokens are issued by one or more user(s) of the control system with privileges to issue such promissory tokens. For example, in some embodiments, such users include one or more producer(s) or distributor(s) of energy, which may be provided with administrative user privileges, allowing them to create terms in the form of an offer to produce or distribute energy to another user. In some such embodiments, one or more of such blockchain(s) are used to record energy-related deal terms, and transactions based thereon. For example, in some such embodiments, such a producer(s) and/or distributor(s) of energy may issue promissory tokens on such a blockchain, which tokens serve as a smart contract between such a producer(s) or distributor (e.g., any of example preferred energy generation entities 103) and another party (e.g., a local distributor entity, such as any of local distributor entities 107, or an end consumer, such as any of example local consumers 109) securing terms for the purchase of energy to be provided to such other party at a future time. In some such embodiments, such a purchase of energy is a purchase of preferred energy. In some such instances, such promissory tokens may be visible, or at least partially visible, to any party participating in an energy supply chain providing such preferred energy (e.g., presented as information conveyed within a specialized tool of a GUI created by the control system).

In various embodiments, preferred energy generation entities 103, wholesale regional distributor entities 105, local distributor entities 107; and local consumers 109 may be any type of such users, including but not limited to energy producing and consuming entities and/or individuals, as will be readily apparent to those of ordinary skill in the art. For example, in some embodiments, local consumers 109 may include individual or household residential consumers of energy, from other users of the control system (such as an electrical power utility company). In some embodiments, such local consumers 109 may be organized in local communities, such as example local user community 111, and any number of such communities, up to and including an Nth local user community 113. Similarly, in various embodiments, any number of regional or local distributor entities 107, including example local distributor entity 115, local distributor entity 116, and up to and including a final (or "Nth") local distributor entity 117, may be included, as will also be so readily apparent. Also similarly, preferred energy generators 103 may include any number of sub-types and entities within each sub-type, such as example nuclear power generating entities 119, example wind power generating entities 121 and example solar power generating entities 123. In various embodiments, any or all of the regional or local distributors 107 may provide energy, sourced from any or all of such preferred energy generator entity(ies) 103, and types thereof, to any number those consumer(s) 109 and community(ies), such as example community 111, through a wide variety of possible energy supply chain routes. Some of such possible supply chain routes, with various numbers and orders of involved users, are illustrated by example supply chain route indicating arrows 125. Of course, the example supply chain routes so illustrated are merely examples of the virtually innumerable possible, alternative routes and partial routes through supply chain environment 100, and/or similar environments.

In some embodiments, any aspect of the supply chain, and any terms for the provision of preferred energy, via promissory tokens, as discussed above, may be visible to any user of the control system. In other embodiments, only some aspects of the supply chain, and/or some terms of such promissory tokens, may be visible to some users of the control system. For example, in some embodiments, any of preferred energy generator entities 103 may view a GUI element presented on computer hardware of the control system, presenting information related to the demand for preferred energy. As discussed, such information related to demand, and/or contracted delivery times for preferred energy, may be based on promissory tokens recorded on a blockchain, with which the control system is in communication. Based on that information, in some embodiments, such preferred energy generator entities 103 may then plan for and provide an amount of preferred energy to be produced at times in the future. For example, in some embodiments, the preferred energy generator entities 103 may view the number of promissory tokens evidencing an amount of a particular type of preferred energy required to be delivered at a particular point in time (e.g., solar energy, required for delivery in a pre-set amount of time, such as three hours), and set aside capacity to meet that obligation. In some embodiments, government(s) and/or industry consortium(s) may also be user(s) of the control system, and may adjust parameters of smart contracts to which they are a party, on such a blockchain, in reaction to such information, which they may similarly view through the control system. In this sense, promissory tokens may serve as evidence of levels of demand for preferred energy and/or particular types thereof, downstream in the energy production and distribution supply chain.

Figure 2:
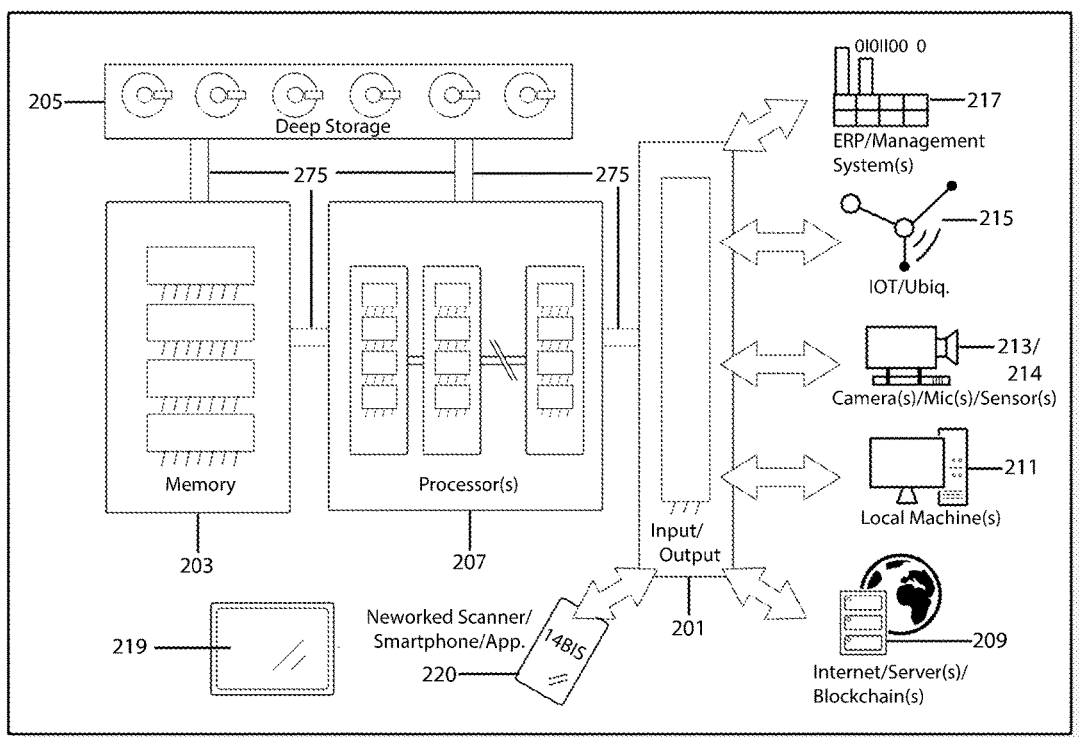
FIG. 2 is a schematic block diagram of some elements of a control system in accordance with some example embodiments of the invention.

FIG. 2 is a schematic block diagram of some elements of a control system (hereinafter, the "system" or "control system") 200, in accordance with an example embodiment of the present invention. In some example embodiments, the control system incorporates a non-transitory machine-readable medium storing instructions that, when executed by one or more processors, execute various aspects of the present invention described in this application. The generic and other components and aspects described herein are not exhaustive of the many different systems and variations, including a number of possible hardware aspects that might be used, in accordance with the example embodiments of the invention. Rather, the control system 200, and the description herein, reflect certain example embodiments.

Control system 200 includes an input/output device 201, a memory device 203, long-term data storage device 205, and processor(s) 207. The processor(s) 207 is (are) capable of receiving, interpreting, processing and manipulating signals and executing instructions for further processing and for output, pre-output and/or storage in and outside of the system. The processor(s) 207 may be general or multipurpose, single- or multi-threaded, and may have a single core or several processor cores, including microprocessors. Among other things, the processor(s) 207 is/are capable of processing signals and instructions for the input/output device 201, to cause a user interface to be provided or modified for use by a user on hardware, such as, but not limited to, computer system peripheral devices, such as a mouse, keyboard, touchscreen and/or other display 219, with specialized tools (e.g., a transactional tool, feedback presentation tools, clean energy transaction tracking and verification tools, and other tools, incorporating data and information and as set forth in this application) and/or presentation and input-facilitating software (as in a graphical user interface, a.k.a. a "GUI") (e.g., on local machine(s) 211, display 219 or smartphone 220). Some examples of some such user interfaces are provided below, and in reference to subsequent figures.

For example, user interface aspects, such as graphical "windows," "buttons" and data entry fields, may present via, for example, a display, any number of selectable options and/or data entry fields to aid in carrying out any aspect of the invention set forth in this application. In some embodiments, when any such option and/or data entry field is selected and/or data is entered into control system 200 through it, such selection causes aspects of the control system to command other aspects of the control system to track, access and modify data related to supply and demand related to the generation and distribution of preferred energy, desired energy, and other types of energy, within an energy supply chain, and, in some such embodiments, to record additional data based thereon. In some embodiments, some of such aspects are managed by an ERP, which may be included within, or in communication with, the control system, to scan and store information in relation to those data, and to provide digital signatures, identification codes or information, and record them in a secure manner on a network (e.g., the Internet and/or another network incorporating a blockchain). For example, and as explained in greater detail elsewhere in this application, the control system may provide a transactional tool, and, in response to actuation of that transactional tool, facilitate the execution of a smart contract, and/or the creation of a token on a blockchain, related to a requirement to produce or distribute energy to a consumer at a time in the future. In some embodiments, the control system may record and label promissory tokens and other parameters for the provision or distribution of preferred energy and/or clean energy to be managed by the control system, and provide secure identifiers and/or other data related to the asset to the control system, where it is stored (e.g., on long-term data storage device 205, or network(s), server(s) and/or on blockchain(s) 209). Within the meaning of this application, a "token label" is a label, identifier, tag, particle, or any other tool configured to be associated with a physical asset and/or virtual asset (an "asset") that contains information about energy generation or distribution service by an entity and/or for an energy consumer. In some embodiments, the control system may also facilitate the creation of, recordation of, encryption of, and other actions with respect to promissory tokens, governance variables, or any other asset set forth in this application. The processor(s) 207 may execute instructions stored in memory device 203 and/or long-term data storage device 205, and may communicate via system bus(ses) 275. Input/ output device 201 is capable of input/output operations for the system, and may include and communicate through input and/or output hardware, and instances thereof, such as a computer mouse, scanning device or other sensors, actuator(s), communications antenna(ae), keyboard(s), smartphone(s) and/or PDA(s), networked or connected additional computer(s), camera(s) or microphone(s), mixing board(s), real-to-real tape recorder(s), external hard disk recorder(s), additional movie and/or sound editing system(s) or gear, speaker(s), external filter(s), amp(s), preamp(s), equalizer(s), computer display screen(s) or touch screen(s). Such input/output hardware could implement a program or user interface created, in part, by software, permitting the system and user to carry out the user settings and input discussed in this application. Input/output device 201, memory device 203, data storage device 205, and processor(s) 207 are connected and able to send and receive communications, transmissions and instructions via system bus(ses) 275. Data storage device 205 is capable of providing mass storage for the system, and may be or incorporate a computer-readable medium, may be a connected mass storage device (e.g., flash drive or other drive connected to a Universal Serial Bus (USB) port or Wi-Fi), may use back-end (with or without middle-ware) or cloud storage over a network (e.g., the Internet) as either a memory backup for an internal mass storage device or as a primary memory storage means, or may simply be an internal mass storage device, such as a computer hard drive or optical drive. Generally speaking, the system may be implemented as a client/server arrangement, where features of the system are performed on a remote server, networked to the client and made a client and server by software on both the client computer and server computer. Also generally speaking, the system may be implemented as middleware, whereby it provides output and other services to an external system, including, but not limited to, any of the example devices and auxiliary devices and/or systems, shown as internet server(s) and blockchain(s) 209, local machine(s) 211, cameras and microphones 213, sensor(s) 214, internet of things or other ubiquitous computing devices 215, ERP 217, a tag scanner, touchscreen and/or other display 219 and smartphone 220. Similarly, the control system 200 is capable of accepting input from any of those auxiliary devices and systems, and modifying stored data within them and within itself, based on any input or output sent through input/output device 201.

Input and output devices may deliver their input and receive output by any known means, including, but not limited to, any of the hardware and/or software examples shown as internet server(s) and blockchain(s) 209, local machine(s) 211, cameras and microphones 213, sensor(s) 214, internet of things or other ubiquitous computing devices 215, ERP 217, display 219 and smartphone 220.

While the illustrated example of a control system 200 in accordance with the present invention may be helpful to understand the implementation of aspects of the invention, any suitable form of computer system known in the art may be used—for example, in some embodiments, a simpler computer system containing just a processor for executing instructions from a memory or transmission source. The aspects or features set forth may be implemented with, and in any combination of, digital electronic circuitry, hardware, software, firmware, middleware or any other computing technology known in the art, any of which may be aided with external data from external hardware and software, optionally, by networked connection, such as by LAN, WAN or the many connections forming the Internet. The system can be embodied in a tangibly-stored computer program, as by a machine-readable medium and propagated signal, for execution by a programmable processor. The many possible method steps of the example embodiments presented in herein, in the present application, may be performed by such a programmable processor, executing a program of instructions, operating on input and output, and generating output and stored data. A computer program includes instructions for a computer to carry out a particular activity to bring about a particular result, and may be written in any programming language, including compiled and uncompiled and interpreted languages and machine language, and can be deployed in any form, including a complete program, module, component, subroutine, or other suitable routine for a computer program.

Figure 3:
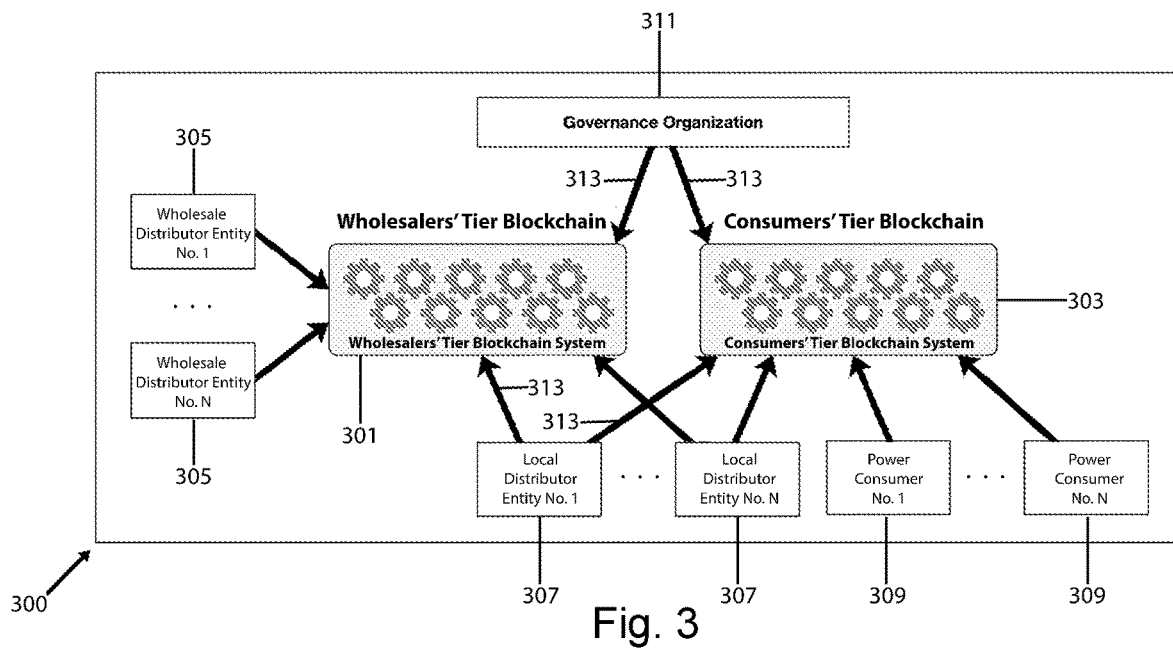
FIG. 3 is a schematic block diagram of some example elements of a multiple-tiered blockchain system, which may be included within, or in communication with, a control system, such as that set forth above, in reference to FIG. 2, carrying out some embodiments of the present invention.

FIG. 3 is a diagram of some example elements of a multiple-tiered blockchain system 300, which may be included within, or in communication with, a control system, such as that set forth above, in reference to FIG. 2, carrying out some embodiments of the present invention. As pictured, the multiple-tiered blockchain system 300 includes two example blockchains, namely: 1) a wholesalers' tier blockchain 301; and 2) a consumers' tier blockchain 303. However, as will be apparent to those of ordinary skill in the art, a greater number of blockchains than the two example blockchains pictured may be included, in other embodiments. For example, in some embodiments, each local consumer community, such as the example communities pictured as local consumer community 111 through Nth local user community 113, may use a separate blockchain.

Turning first to the wholesalers' tier blockchain 301, such a blockchain may be used by wholesale energy distributors, such as the example wholesale regional distributor entities 105, discussed above, or the example wholesale distributor entities 305, to make recordings or other alterations to that blockchain, to carry out any energy supply chain and demand management aspects set forth in this application. For example, in some such embodiments, such wholesale energy distributors may use wholesalers' tier blockchain 301 to manage bookings, fulfillment, and sales of preferred energy virtual assets, or other energy-related virtual assets (sometimes referred to herein as "virtual assets"). In some embodiments, virtual assets are objects and/or data used by a control system and blockchain to represent units of energy, subject to trading by entities and individual users. In some embodiments, such virtual assets are the subject of tokens and/or smart contracts (such as promissory tokens discussed in this application) exchanged, executed and/or recorded with the aid of the blockchain. All such tokens or smart contracts carry the identity (i.e., public key) of a transmitter/sender, and the identity of an intended recipient (if any), and a timestamp.

Similarly, consumers' tier blockchain 303 may be used by one or more local energy distributors, such as local distributor entities 107, and/or consumers of energy, such as example local consumers 109, discussed above, or the example local distributor entities 307 or consumers of energy 309, to make recordings or other alterations to that blockchain, and carry out any energy supply chain and demand management aspects set forth in this application. For example, in some such embodiments, such local energy distributors or consumers of energy may use consumers' tier blockchain 303 to manage or make bookings, or manage fulfillment and sales of preferred energy virtual assets (sometimes also referred to herein as "virtual assets"), at or about the consumer end of the energy supply chain. In some embodiments, a governance organization 311 may also have access to any and all such blockchains, to control, modify or otherwise manage the energy supply chain in accordance with aspects of the present invention. For example, in some embodiments, such a governance organization is a regulatory body of a state or local government, or an industry organization.

In some embodiments, some intermediate users, such as governance organization 311 and/or local distributor entities 307, may be authorized by the control system to make recordings or other alterations to either blockchain, as demonstrated by communications/action arrows 313.

Additional details of the example wholesalers' tier blockchain 301 and the example consumers' tier blockchain 303, are set forth below.

Figure 4:
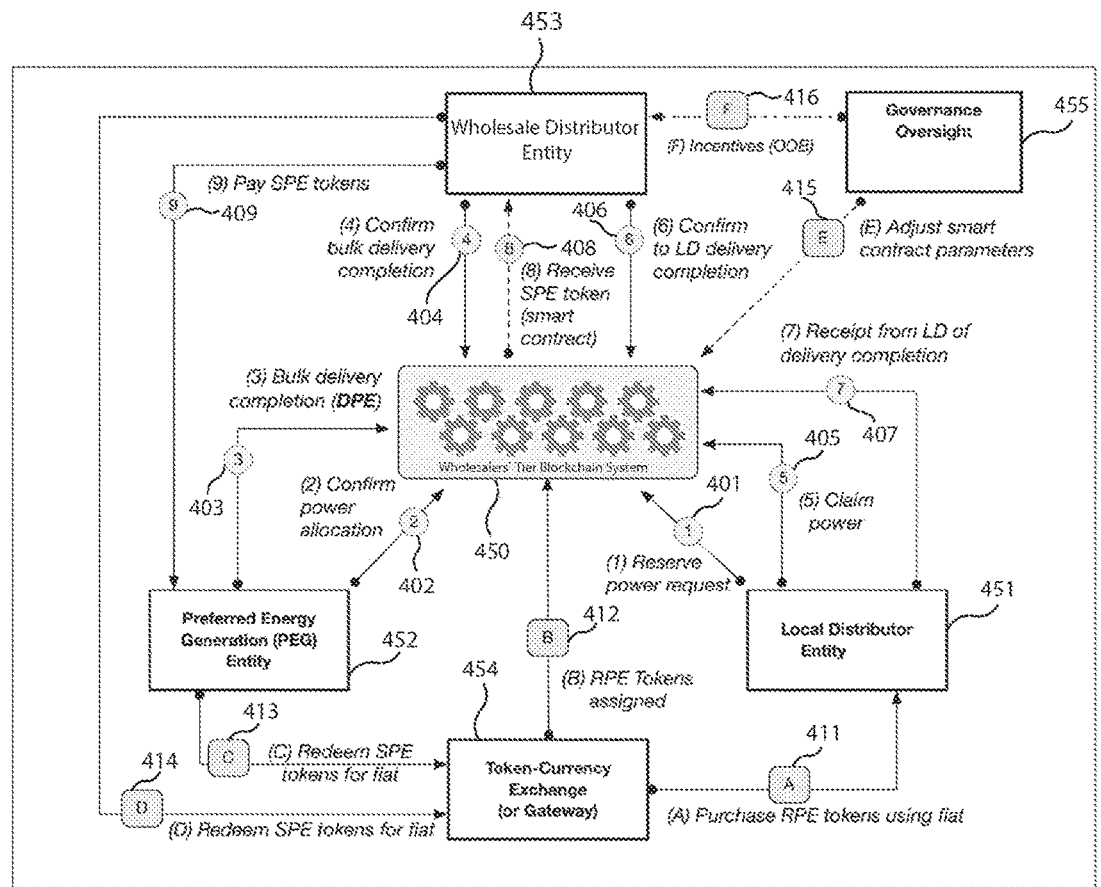
FIG. 4 is an example block diagram of aspects of a wholesalers' tier blockchain system, which may include or be included within a control system, such as the example control system set forth in reference to FIG. 2.

FIG. 4 is an example block diagram of aspects of a wholesalers' tier blockchain system 400, which may include or be included within a control system, such as the example control system 200. FIG. 4 also depicts example steps of a process which may be carried out by a control system and the wholesalers' tier blockchain 450, in accordance with aspects of the present invention. Generally speaking, entities connected for communications with the control system may interact with the wholesalers' tier blockchain 450 to communicate an intent to purchase energy (e.g., preferred energy) or particular amounts thereof, or to aid in controlling the generation and/or distribution of energy within an energy supply chain.

Beginning with example step 401, in some embodiments, the control system may begin by receiving a promise by a local distributor entity, such as any of local distributor entities 107 or example local distributor entity 451, to purchase preferred energy. In some embodiments, this promise is received in the form of a promissory token, as discussed above, issued, transmitted and recorded on the blockchain 450 (e.g., by the local distributor entity). Such a promissory token may be referred to as a "reserve preferred energy token" (or, in some instances in this application, as an "RPE token"). In some embodiments, a reserve preferred energy token may include data indicating an amount of preferred energy to be purchased, in a unit of measure (e.g., Kilowatts or Watts Peak). In some embodiments, such a reserve preferred energy token may also include the identity of (e.g., via a public key linked or otherwise associated with) a local distributor who sent the token. In some embodiments, such a reserve preferred energy token may also include a time stamp. In some embodiments, a subsystem of blockchain system 400, namely, token currency exchange or gateway 454, may control and effect the creation and issuance of such a reserve preferred energy token, e.g., in step 412.

The control system may then proceed to subsequent step 402, in which it permits a preferred energy generation entity 452 to access data related to the reserve preferred energy token, and the preferred energy generation entity responds by issuing and/or transmitting another form of token to blockchain 450, acknowledging the reserve preferred energy token, and committing to producing and delivering either all or a part of the preferred energy to be purchased. Such another form of token may be referred to as a "confirm reserve preferred energy token." In some embodiments, a total outstanding amount of similarly requested preferred energy, from any user, which has not already been subject to similar commitments, is also totaled by the control system, and such a confirm reserve preferred energy token evidences a commitment to producing and delivering either all or a part of that total preferred energy to be purchased, which is not subject to other, similar commitments. In some embodiments, such a confirm reserve preferred energy token also includes data indicating an amount of preferred energy to be produced and delivered, in a unit of measure (e.g., Kilowatts or Watts Peak). In some embodiments, the confirm reserve preferred energy token includes the identity (e.g., public key) of the preferred energy generation entity. Of course, the preferred energy generation entity 452 may be any of the preferred energy generation entities 103, discussed above. In some embodiments, such a confirm reserve preferred energy token carries a cryptographic hash of the corresponding reserve preferred energy token and/or transaction recorded on the same blockchain. In some embodiments, such a confirm reserve preferred energy token also is addressed to a public key of a local distribution entity which is a party to the transaction (that issued the corresponding reserve preferred energy token).

Next, in step 403, after the preferred energy generation entity 452 delivers all or a discrete part of the energy subject to the confirm reserve preferred energy token, the preferred energy generation entity 452 may use the control system to create, transmit and sign (a.k.a., "issue") another token to blockchain 450, evidencing the amount of energy, and a recipient of that energy, referred to as a "delivered preferred energy token." Preferably, if more than one entity (e.g., wholesale distributor) received that part of the energy, a separate delivered preferred energy token is so created and transmitted onto the blockchain for each amount of energy, and the recipient thereof. Also preferably, each of such tokens specifies the amount of energy (and units thereof) delivered to the entity, the identity of the entity, and a timestamp. Also preferably, the control system sums the total amount of energy delivered by the preferred energy generation entity 452, and cross-checks that total to ensure that it corresponds with a total amount of energy generated (or energy generation capacity of) the preferred energy generation entity 452, in some embodiments.

In subsequent step 404, after a wholesale receiving entity (such as wholesale distributor entity 453) receives delivery of the all or a discrete part of the energy subject to the delivered preferred energy token, it may search for the delivered preferred energy token recorded on blockchain 450 in step 403, using the control system, and proceeds to create, issue and/or transmit a token to blockchain 450 confirming the receipt of the corresponding energy—a.k.a., a "confirm delivered preferred energy token." In some embodiments, the confirm delivered preferred energy token must contain a record of an amount of energy confirmed to be delivered, which matches the amount stated in the corresponding delivered preferred energy token. Preferably, in some embodiments, any discrepancy between those two stated amounts must be resolved outside of any blockchain transaction, by the entities involved (e.g., through any suitable form of dispute resolution.) In some embodiments, any delivered preferred energy token that has not been subject to a corresponding confirm delivered preferred energy token for the same amount (a.k.a., the delivered preferred energy token has not been "answered"), by the same indicated wholesale receiving entity (e.g., wholesale distributor) will "time out" after a preset amount of time has elapsed, meaning that it is no longer actionable by any user of control system, or blockchain 450. In some embodiments, the length of time before a deliver preferred energy token times out may be variably set by a smart contract and governance variable, as set forth in greater detail below. In some embodiments, such a preset amount of time is so preset by a governance oversight smart contract, as will be described in greater detail below. In some embodiments, such timed-out tokens may also be resolved outside of any blockchain transaction, by the entities involved (e.g., through any suitable form of dispute resolution between the preferred energy generation entity and the wholesale distributor entity.)

Although no longer actionable after timing out, timed out tokens are preferably still searchable, and may contain information relevant to users, which may be viewed via the control system, in some embodiments. For example, in some embodiments, a governance organization, such as example governance organization 311, may view such information and act upon it. For example, in some embodiments, the governance organization may take action against users that are repeatedly and/or frequently "late" answering such tokens, and therefore considered "lazy," lacking diligence, or otherwise underperforming parties, and vice versa. In some embodiments, such a governance organization or another user of the control system may use such information for any other suitable purpose (e.g., general statistical insights into the frequency of unanswered tokens).

In subsequent step 405, once a particular number of confirm delivered preferred energy tokens have been issued and/or transmitted to the blockchain 450, by the wholesale entity, the corresponding local distribution entity(ies), such as local distributor entity 451, can then claim the amount of preferred power ("green energy") subject to the tokens, using the control system. In some embodiments, this step is carried out, at least in part, by the local distributor entity 451 issuing and/or transmitting a token evidencing its claim of that amount of preferred power and readiness to receive that preferred power—a.k.a., a "claim preferred energy token." Once the control system records the claim preferred energy token on the blockchain 450, a receiving wholesale distributor entity, such as example receiving wholesale distributor entity 453, which may be any of the wholesale regional distributor entities 105, discussed above, may then deliver the claimed amount of preferred energy to the local distributor entity 451. In some embodiments, the amount of energy stated in the claim preferred energy token must be less than or equal to the reserve preferred energy tokens initially transmitted by the local distributor entity. In other words, the local distributor entity 451 would not be permitted to claim more preferred energy in a single supply chain cycle, than it had reserved earlier, in step 401, in such embodiments. In some embodiments, the local distributor entity 451 may, however, be permitted to claim less preferred energy than it had so reserved. In some such embodiments, a governance smart contract may determine a permitted amount of variance between reserved and claimed amounts of such preferred energy, as discussed further below. In some embodiments, users may be provided with a GUI tool expressing the percentage of claimed preferred energy of the reserved preferred energy, for each local distributor entity.

Proceeding to step 406, after completing delivery of the claimed amount of power to the local distributor entity 451, in some embodiments, the receiving wholesale distributor entity 453 issues and/or transmits a token to blockchain 450 confirming that delivery of that amount of power—a.k.a., a "confirm claim preferred energy token." Again, the amount of energy indicated in that token must not exceed the amount of energy stated in the claim preferred energy token, as discussed above in relation to step 405. In some embodiments, the confirm claim preferred energy token contains a cryptographic hash of the claim preferred energy token, to which the wholesale distributor entity is responding.

In subsequent step 407, the control system facilitates the local distributor entity 451 "closing the deal," ending the distribution cycle, by issuing and/or transmitting another form of token acknowledging the receipt of power from the wholesale distributor entity 453—a.k.a., a "receipt of claimed preferred energy token." In some embodiments, the receipt of claimed preferred energy token contains a cryptographic hash of a corresponding confirm claim preferred energy token. In some embodiments, the receipt of claimed preferred energy token is addressed to the wholesale distributor entity.

In subsequent step 408, once the local distributor entity 451 has issued and/or transmitted the receipt of claimed preferred energy token to blockchain 451, the control system then permits the wholesale distributor entity 453 to claim ownership of the corresponding reserve preferred energy token, recorded on the blockchain—namely, the reserve preferred energy token which the local distributor entity transmitted in step 401. In at least some respects, therefore, the actions of step 408 close the loop on the request set forth in step 401, with the wholesale distributor entity 453 successfully delivering the requested preferred energy to the local distributor entity 451 that requested it. In some embodiments, the transfer of ownership of the receipt of claimed preferred energy token is performed by a special type of smart contract, referred to as a "closure smart contract," which is a piece of software executing on every node of the blockchain 450. In some embodiments, the closure smart contract scans blocks of a ledger of the blockchain 450 periodically (e.g., once every minute) for new receipt of claimed preferred energy tokens issued by a local distributor entity (addressed to the wholesale distributor entity 453). Once the closure smart contract locates such a new receipt of claimed preferred energy token, the closure smart contract generates a new form of token, referred to as a settlement of preferred energy token (or "SPE token"), addressed to the wholesale distributor entity 453, which may then receive it.

Finally, in step 409, the control system facilitates payment by the wholesale distributor entity 453 to the preferred energy generation entity 452 for the preferred energy that the preferred energy generation entity 452 provided to the wholesale distributor entity 453 (in step 403) (for which the confirm delivered preferred energy token was issued by the wholesale distributor entity 453 to the preferred energy generation entity 452, in step 404). In some embodiments, such a payment consists of the wholesale distributor entity 453 issuing and/or transmitting an equivalent-in-value amount of settlement preferred energy tokens (obtained in Step 408) to an address of the preferred energy generation entity 452 on the blockchain 450.

In some embodiments RPE tokens may be initially purchased from token currency exchange or gateway 454, e.g., in exchange for fiat, in step 411. Conversely, in some embodiments, SPE tokens may be redeemed for fiat, e.g., by preferred energy generation entity 452, in step 413, or by wholesale distributor entity 453, in step 414.

As mentioned above, in some embodiments, a system for managing preferred energy transactions, including wholesalers' tier blockchain system 400, may include a governance body, such as example governance oversight entity 455. Among other things, such a governance body may adjust various smart contract parameters, in step 415, and/or create incentives for production and distribution of preferred energy types, and in certain amounts or percentages of traded energy, by various users and participants of the system, e.g., in step 416.

Figure 5:
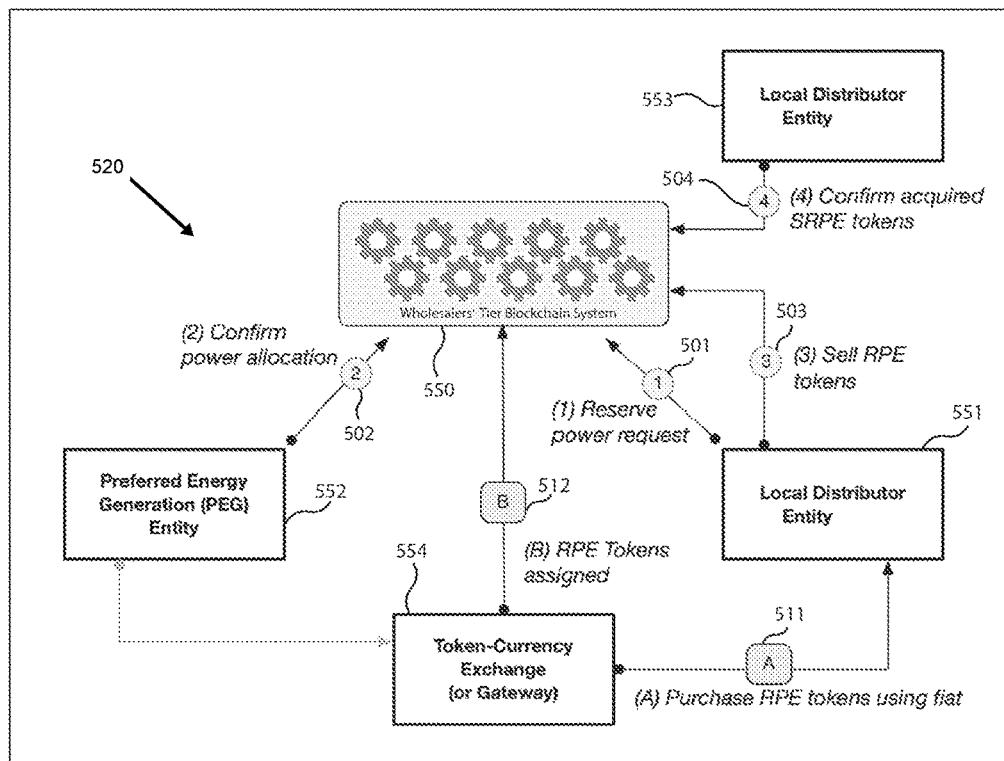
FIG. 5 is another example block diagram of aspects of a wholesalers' tier blockchain system, which may include or be included within a control system, such as control system set forth in reference to FIG. 2, in which a local distributor entity carries out a peer-to-peer sale of confirmed reserve preferred energy tokens to another local distributor entity.

FIG. 5 is another example block diagram of aspects of a wholesalers' tier blockchain system 500, which may include or be included within a control system, such as the example control system 200, in which a local distributor entity carries out a peer-to-peer sale of confirmed reserve preferred energy tokens to another local distributor entity.

By way of background, in some embodiments, a local distributor entity is permitted by the control system to sell confirmed reserve preferred energy tokens to other local distributor entities, through blockchain 450. For example, in some instances, a local distributor entity may have over-purchased reserve preferred energy tokens, relative to its actual needs.

In some embodiments, the control system only permits such a sale of reserve preferred energy tokens after such reserve preferred energy tokens have been confirmed (as set forth is step 402, above) by one or more preferred energy generation entities. In some embodiments, a reserve preferred energy token that has not been so confirmed is considered a promissory indicator only, of the holding local distributor entity, because no preferred energy generation entity has agreed to provide the preferred energy. In such cases, in some embodiments, the holding local distributor entity may be permitted to convert the reserve preferred energy token to fiat currency, for example, at a token-to-currency exchange entity, which may be included in, or in communication with, the control system.

The following are a set of example steps 520 which may be carried out by the control system, using blockchain system 500, to effectuate and/or otherwise facilitate such a sale:

Beginning with step 501, a local distributor entity again (as in step 401) issues a request for preferred energy and/or transmits a promise to purchase preferred energy by issuing, or causing the issuance of, a reserve preferred energy token to the blockchain 550 (which is a subsystem of the wholesalers' tier blockchain system 500 and, therefore, also a type of wholesalers' tier blockchain system), with the aid of the control system.

Proceeding to step 502 (and, again, as in step 402) a preferred energy generation entity (e.g., a solar plant or a wind farm), such as example preferred energy generation entity 552, may respond to the reserve preferred energy token by issuing and/or transmitting a confirm reserve preferred energy token.

Following that, in step 503, a first local distributor entity 551 (a seller of its confirmed reserve preferred energy token(s)) negotiates a price for selling such confirmed reserve preferred energy token(s)) to a second local distributor entity 553. Following such a successful negotiation, the first local distributor entity 551 issues and/or transmits a new form of token, referred to as a "sell reserve preferred energy token," or "SRPE token," to the blockchain 551. In some embodiments, the sell reserve preferred energy token includes a cryptographic hash of the reserve preferred energy token (recorded on the blockchain 550 in step 501.) In some embodiments, the sell reserve preferred energy token includes a cryptographic hash of the confirm reserve preferred energy token (recorded on the blockchain 550 in step 502.) In some embodiments, the sell reserve preferred energy token includes a timestamp. In some embodiments, the sell reserve preferred energy token includes the address of the buyer, namely, the second local distributor entity 553.

Finally, in step 504, the control system facilitates the second local distributor entity 553 in confirming the transferal of ownership to the confirmed reserve preferred energy token, by allowing the second local distributor entity 553 to issue and/or transmit a new form of token, referred to as a "confirm sell reserve preferred energy token" or "CSRPE token." In some embodiments, this token includes a cryptographic hash of the corresponding sell reserve preferred energy token which has already been recorded on the blockchain (in step 503).

As mentioned above, in some embodiments, wholesalers' tier blockchain systems (e.g., 301, 400 and 500) and consumers' tier blockchain systems (e.g., 303) include some governance aspects, which will now be explicated further.

In some embodiments, such blockchain systems are governed by a number of rules enacted for the benefit of members or other stakeholders in the blockchain system.

On each blockchain, governance may be expressed through the execution of a number of smart contracts, recorded on the blockchain with the aid of the control system, referred to as governance smart contracts. In some embodiments, governance smart contracts alter a number of variables, referred to as "governance variables," which are also so recorded on the blockchain. In some embodiments, such governance variables may be data and/or information in the type/value format that is recorded on a ledger of the blockchain. In some embodiments, smart contracts (e.g., all other smart contracts that depend in that governance variable) on the blockchain must search for the latest value (e.g., most recent updated by the governance body) of a governance variable type, and input that value as input and/or a parameter to smart contract computation(s). Thus, in such embodiments, there is dependence of each governance smart contract on certain governance variable values. In some such embodiments, all smart contracts and operations on the blockchain (or, in some embodiments, a multi-level blockchain and/or plurality of blockchains within a system) must first check the latest of each governance variable value before proceeding to be performed.

In some embodiments, only an authorized human (authorized by a human governance board, governance oversight organization or other governing entity) holds a private-key which can activate such a governance smart contract. Thus, in such embodiments, only an authorized human can change the governance variable values on the blockchain. In some embodiments, all governance smart contracts recorded within a system may be owned, managed, executed and signed by such a governing entity that legally manage the (e.g., multi-level) blockchain system. In some embodiments, all other smart contracts on the blockchain(s) of the system must be approved by the governing entity.

Some governance smart contract/governance variable pairs are intended for all entities in a blockchain, while other pairs maybe relevant only to certain entities, in some embodiments. In some embodiments, all transactions generated by running a governance smart contract are signed by a private-key held by the person authorized by the governance board. Such transactions are self-addressed (i.e. sent to the matching public-key address).

Next, this application sets forth certain governance smart contract/governance variable pairs for a wholesale tier blockchain, such as any of the wholesale tier blockchains set forth above.

There are several types of governance smart contract/governance variable pairs that may be present on a wholesale tier blockchain system.

In some embodiments, one type of smart contract/governance variable pair is based on a type of governance variable referred to as a "token-currency exchange governance variable." This governance variable sets the value of each RPE token against a fiat currency, such as the U.S. Dollar. This variable is set by running a "token-currency exchange governance smart contract," which results in a new transaction on the blockchain carrying to new value for the token-currency exchange.

In some embodiments, a token-currency exchange entity comprises, or is comprised within, a control system comprising computer hardware and/or software, which control system is owned and operated by a governing entity (as discussed above). In some embodiments, the token-currency exchange has the task of: (1) assigning purchased reserve preferred energy tokens (discussed elsewhere in this application) and virtual assets to correct owner(s) (e.g., a buyer); (2) controlling the sale and/or redemption of settlement preferred energy tokens (discussed elsewhere in this application) in a wholesalers' tier blockchain; (3) controlling the sale and/or redemption of settlement net metering tokens (discussed elsewhere in this application) and energy virtual asset tokens in a consumers' tier blockchain; and (4) alerting a governing entity of particular unusual behaviors of the blockchain(s), blockchain system(s) and/or unusual prices of tokens.

In some embodiments, another type of smart contract/governance variable pair is based on a type of governance variable referred to as a "maximum RPE tokens obtainable per period governance variable." This governance variable sets the maximum number of RPE tokens obtainable by a given local distributor entity. This variable is set by running the maximum RPE Smart Contract, which results in a new transaction on the blockchain ledger carrying a new value for the maximum RPE tokens obtainable per period governance variable. The purpose of this governance variable is to prevent one (or few) local distributor entity from reserving too much (i.e. hogging) RPE tokens, which may starve other local distributor entities and which maybe risky to the other entities in the ecosystem.

In some embodiments, another type of smart contract/governance variable pair is based on a type of governance variable referred to as a "minimum RPE tokens obtainable per period governance variable." This governance variable sets the minimum number of RPE tokens that must be obtained by a given Local Distributor entity per period of time. This variable is set by running a "minimum RPE tokens obtainable per period smart contract," which results in a new transaction on the blockchain ledger carrying the new value for the minimum RPE tokens obtainable per period governance variable. The purpose of this governance variable is to mandate local distributor entities to purchase preferred (e.g., green or clean) energy by way of buying RPE tokens.

In some embodiments, another type of smart contract/governance variable pair is based on a type of governance variable referred to as a "maximum resell reserve preferred energy per period governance variable." This governance variable sets the maximum number of RPE tokens that can be sold by a given local distributor entity to a second local distributor entity for a given period of time. This variable is set by running a "maximum resell reserve preferred energy per period smart contract," which results in a new transaction on the blockchain ledger carrying the new value for the maximum resell reserve preferred energy per period governance variable. The purpose of this governance variable is to limit the number of RPE tokens that can be sold by one local distributor entity to another in a given period, ensuring that each local distributor entity is committed to purchasing a minimal amount of clean energy from the preferred energy generation entity (via the wholesale distributor entity).

In some embodiments, another type of smart contract/governance variable pair is based on a type of governance variable referred to as a "minimal delivered preferred energy per period governance variable." This governance variable sets the minimal energy unit that a preferred energy generation entity must deliver per period of time. This variable is set by running a "minimal delivered preferred energy per period smart contract," which results in a new transaction on the blockchain carrying the new value for the minimal delivered preferred energy per period governance variable. This prevents the preferred energy generation entities from producing preferred energy at a lower rate than desired by the governance body (a.k.a., being "too lazy" in producing clean energy per unit of time).

In some embodiments, another type of smart contract/governance variable pair is based on a type of governance variable referred to as a "minimal confirmed delivered preferred energy per period governance variable." This governance variable sets the minimal energy unit that a wholesale distributor entity, which also acts as a buyer, must obtain (purchase) per period of time from each preferred energy generation entity. This prevents such a wholesale distributor entity from "ignoring" the preferred energy generation entities (e.g., who are ready to sell clean energy units). This variable is set by running a "minimal confirmed delivered preferred energy per period smart contract," which results in a new transaction on the blockchain ledger carrying a new value for the minimal confirmed delivered preferred energy per period governance variable.

Figure 6:
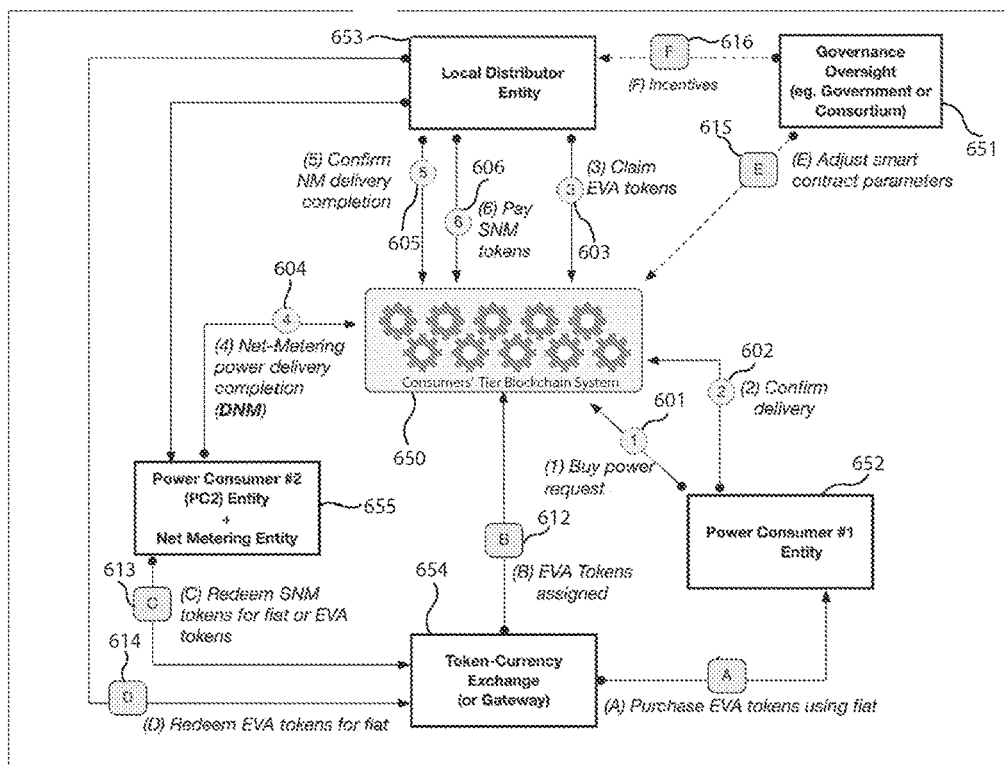
FIG. 6 is an example block diagram of aspects of a consumers' tier blockchain system, which may include or be included within a control system, such as the example control system set forth in reference to FIG. 2.

FIG. 6 is an example block diagram of aspects of a consumers' tier blockchain system 600, which may include or be included within a control system, such as the example control system 200. FIG. 6 also depicts example steps of a process which may be carried out by a control system and the consumers' tier blockchain 650 (which, as with other blockchains set forth in this application, may be a subsystem of a blockchain system, such as consumers' tier blockchain system 600, and therefore also a consumers' tier blockchain system), in accordance with aspects of the present invention. Generally speaking, as with other blockchains discussed in this application, entities or individuals connected for communications with the control system may interact with the consumers' tier blockchain 650 to communicate an intent to purchase energy (e.g., preferred energy) or particular amounts thereof, or to aid in controlling the generation and/or distribution of energy within an energy supply chain.

FIG. 6 depicts a consumers' tier blockchain system 600 including an example two (2) types of energy consumer entities or individuals (also referred to in this application as "power consumer(s)") that may interact with the control system in particular ways. The first type of power consumer is an entity or person who purchases energy directly from a grid system, as discussed elsewhere in this application. One example of such a power consumer is shown as example power consumer 651, which may be any possible type(s) of such a power consumer (e.g., businesses, residential consumers, etc.). A second type of power consumer is an entity or person who participates in net metering with a grid, as discussed in this application. Some energy consumers of this type generate energy (and, sometimes, preferred energy or desired energy), and sell such energy to the grid. Some energy consumers of this type both purchase energy from the grid system, and sell some energy back to the grid, at least at some times. One example of such a power consumer is shown as example power consumer 652, which also may be any possible type(s) of such a power consumer (e.g., businesses, residential consumers, etc.) As discussed elsewhere, energy consumers, such as example power consumer 652, that both buy energy from and sell energy to the grid may own power generation equipment, such as solar panels, in some embodiments. In some embodiments, such energy consumers also may own energy storage device(s) such as an array of batteries or capacitors. In some such embodiments, such users may sell energy to the grid at times of their choosing by sending energy to the grid from such energy storage devices (e.g., when payment rates offered on the grid are favorable). In some such embodiments, as will be demonstrated in greater detail below, the control system and consumers' tier blockchain system 600 enable and enhance such selling back and net metering activities. For example, in some embodiments, the control system and consumers' tier blockchain system 600 develop information regarding such selling back and net metering activities, which is made accessible to users. In some such embodiments, such information is made accessible to and/or provided to a plurality of types of users, enhancing information accessibility. For example, in some embodiments, such information accessibility is provided to power consumers, as discussed above. As another example, in some embodiment, such information accessibility is provided to local distributor entities, as discussed in this application. As yet another example, in some embodiment, such information accessibility is provided to governance bodies, as discussed in this application. In some such embodiments, such a governance body may be a government entity (such as a municipal government and/or regulator agency thereof). In some embodiments, governance bodies may provide incentives to particular users (e.g., local distributor entities) based on the information which is made accessible, as discussed herein. For example, in some embodiments, such an incentive is created for local distributor entities to purchase power from power consumers that are selling back (e.g., preferred energy) to the grid system.

In some embodiments, information concerning the consumption of and/or demand for preferred energy by power consumers (e.g., the types of preferred energy being consumed or in-demand) is developed through blockchain system 600, and presented or otherwise made available to users of the control system and blockchain system 600. In some embodiments, such users include a plurality of types of users. For example, in some embodiments, at least some of such users are power consumers, as discussed above. As another example, in some embodiments, at least some of such users are local distributor entities, as discussed elsewhere in this application. As yet another example, in some embodiments, at least some of such users are governance bodies. In some such embodiments, such a governance body may be government entity (such as a municipal government and/or regulator agency thereof).

In some embodiments, a control system included in, including or communicatively connected to consumers' tier blockchain system 600 carries out and/or otherwise facilitates the following steps.

As a first step, in some embodiments, a user of the control system and blockchain system 600 (a "user"), namely, a power consumer such as example power consumer 652, may purchase token(s) which are virtual asset(s) representing one or more rights to receive energy from another user, such as example token currency exchange 654 (e.g., for fiat). In some embodiments, such energy may be preferred energy. In such instances, the virtual asset(s) purchased may be referred to as "preferred energy virtual asset(s)."

As a result, in some embodiments, a transaction is then recorded on blockchain 650, evidencing the transaction with example token currency exchange 654. In some embodiments, example token currency exchange 654 initiates such a recording, as pictured, in step 612. In some embodiments, such a recording is in the form of an assertion that example power consumer 652 owns the virtual asset(s)/token(s).

Next, in step 601, after obtaining its virtual asset(s)/token(s), example power consumer 652 may request to purchase preferred energy. In some such embodiments, such a request may be made using another form of promissory token (which, as all other tokens in this application may be, is issued and/or transmitted to a blockchain) referred to as a "buy preferred energy token," which is recorded on blockchain 650. In some embodiments, such a buy preferred energy token includes a statement of an amount of preferred energy required in a transaction. In some embodiments, the buy preferred energy token may include any or all of the following information, in any possible combination or partial combination thereof and/or of other information: (i) a desired amount of preferred energy (e.g., in kilowatts); (ii) an address of the power consumer; (iii) a timestamp; and/or (iv) a digital signature, using a private/public cryptographic key pair of the power consumer.

Next, in Step 602, after the power consumer 651 receives preferred energy from a local distribution entity user, such as example local distributor entity 653, a confirmation of that power delivery, in the form of a new form of token—referred to as a "confirm buy preferred energy token"—is issued and transmitted (recorded on blockchain 650). In some embodiments, the confirm buy preferred energy token may include any or all of the following information, in any possible combination or partial combination thereof and/or of other information: (i) a cryptographic hash of the corresponding buy preferred energy token; (ii) an address of a local distributor entity that delivered the preferred energy; (iii) data concerning the amount of preferred energy delivered to the power consumer (in some embodiments, only if the amount is less than that indicated in the buy preferred energy token); (iv) a timestamp; and (v) a digital signature, using a public/private cryptographic key pair of the power consumer 651. In some embodiments, the public/private cryptographic key pair is required to be the same public/private cryptographic key pair discussed in relation to Step 601, above.

Next, in Step 603, after the confirm buy preferred energy token has been issued and/or transmitted (recorded on blockchain 650), the control system authorizes local distributor entity 653 to claim payment from blockchain 650 (e.g., to receive payment in the form of energy virtual assets/tokens set forth in step 601). In some embodiments, the local distributor may so claim payment, by using a new form of token, referred to as a "claim energy virtual asset token," which it may then record on blockchain 650. In some embodiments, the claim energy virtual asset token includes data regarding the amount of preferred energy. In some embodiments, those data may also include a price per unit of preferred energy. In some embodiments, such a price per unit is in denomination of credits created on blockchain 650, referred to herein as "energy virtual asset units." In some such embodiments, such an amount of preferred energy must match an amount of preferred energy delivered in step 602. In some embodiments, the price per unit must also match a price per unit represented in an earlier step, such as in step 602 (e.g., in the confirm buy preferred energy token). In some embodiments, the claim energy virtual asset token may include any or all of the following information, in any possible combination or partial combination thereof and/or of other information: (i) a cryptographic hash of the corresponding confirm buy preferred energy token; (ii) an address of power consumer 652 (to whom delivery of the preferred energy occurred, as confirmed in step 602); (iii) data related to energy virtual assets claimed using the claim energy virtual asset token; (iv) a timestamp; and (v) a digital signature, using a public/private cryptographic key pair of the local distributor entity 653.

Next, in step 604, the control system allows a second power consumer, such as example power consumer entity 655, to sell surplus preferred energy which it has itself generated, via net metering with a grid system (as also managed by the control system), as follows. In some embodiments, example power consumer entity 655 may so sell such surplus preferred energy to a local energy distributor, such as local distributor entity 653. In some embodiments, after power consumer entity 655 has so sold such surplus preferred energy to local distributor entity 653, power consumer entity 655 is permitted to transmit another form of token to blockchain 650, referred to as a "delivered net-metering token," where it is then recorded. In some embodiments, the delivered net-metering token may include any or all of the following information, in any possible combination or partial combination thereof and/or of other information: (i) data related to the amount of energy delivered to the local distributor entity 653, to whom preferred energy was delivered; (ii) an address of the local distributor entity 653; (iii) a timestamp; (iv) a digital signature, using a public/private cryptographic key pair of the power consumer entity 655.

Next, in step 605, and in response to the delivered net-metering token, and after recording it, the control system allows the local distributor entity to confirm its receipt of the corresponding preferred power. For example, in some embodiments, the control system allows the local distributor entity 653 to so confirm the receipt of power by issuing and/or transmitting a new form of token to the blockchain, where it is recorded. Such a new form of token may be referred to as a "confirmed delivered net-metering token." In some embodiments, the confirmed delivered net-metering token may include any or all of the following information, in any possible combination or partial combination thereof and/or of other information: (i) a cryptographic hash of the corresponding delivered net-metering token (discussed in step 604, above); (ii) an address of the power consumer entity 655 (from whom energy was obtained); (iii) a timestamp; (iv) a digital signature, using a public/private cryptographic key pair of the local distributor entity 653.

Next, in step 606, in some embodiments, the control system requires the local distributor entity 653 to pay for the preferred power delivered from the power consumer entity 655. In some embodiments, such payment is accomplished by the local distributor entity 653 issuing and/or transmitting a new form of token to the blockchain, referred to as a "settlement net-metering token" to the blockchain 650, where it is recorded. In some embodiments, the settlement net-metering token so recorded on the blockchain is addressed to the power consumer entity 655. In some embodiments, the settlement net-metering token may include any or all of the following information, in any possible combination or partial combination thereof and/or of other information: (i) a cryptographic hash of the corresponding confirmed delivered net-metering token (as discussed in step 605); (ii) an address of the power consumer entity 655 receiving the payment; (iii) an amount paid in the payment; (iv) a timestamp; and (v) a digital signature, using a public/private cryptographic key pair of the local distributor entity 653.

In some embodiments, tokens may be redeemed for fiat, e.g., by power consumer entity 655, in step 613, or by local distributor entity 653, in step 614.

As discussed elsewhere in this application, consumers' tier blockchain systems (e.g., 303, and as set forth in FIGS. 4 and 6) include some governance aspects, which will now be explicated further. Among other things, such aspects may include a governance body adjusting various smart contract parameters, in step 615, and/or creating incentives for production and distribution of preferred energy types, and in certain amounts or percentages of traded energy, by various users and participants of the system, e.g., in step 616.

In some embodiments, such blockchain systems are governed by a number of rules enacted for the benefit of members or other stakeholders in the blockchain system, through smart contract/governance variable pairs.

There are several types of governance smart contract/governance variable pairs that may be present on such a consumers' tier blockchain system.

In some embodiments, one type of smart contract/governance variable pair is based on a type of governance variable referred to as a "token-currency exchange governance variable." This governance variable sets the value of each preferred energy virtual asset/token against a fiat currency, such as the U.S. Dollar. This variable is set by running a "token-currency exchange governance smart contract," which results in a new transaction on the blockchain carrying the new value for the token-currency exchange.

In some embodiments, another type of smart contract/governance variable pair is based on a type of governance variable referred to as a "maximum preferred energy virtual assets/tokens obtainable per period governance variable." This governance variable sets the maximum number of preferred energy virtual assets and/or tokens obtainable by a given Power Consumer entity. This variable is set by running a "maximum preferred energy virtual assets/tokens obtainable per period smart contract," which results in a new transaction on the blockchain ledger carrying the new value for the maximum preferred energy virtual assets/tokens obtainable per period governance variable." The purpose of this governance variable is to prevent one (or a few) power consumer entity(ies) from reserving too much (a.k.a., "hogging") preferred energy virtual assets or tokens, which reserving might starve other power consumer entities, and which reserving maybe risky to the other entities in the ecosystem, in some embodiments.

In some embodiments, another type of smart contract/governance variable pair is based on a type of governance variable referred to as a "minimum preferred energy virtual assets/tokens obtainable per period governance variable." This governance variable sets the minimum number of preferred energy virtual assets and/or tokens that must be obtained by a given Power Consumer entity per time period. This variable is set by running a "minimum preferred energy virtual assets/tokens obtainable per period smart contract," which results in a new transaction on the blockchain ledger carrying the new value for the minimum preferred energy virtual assets/tokens obtainable per period governance variable.

In some embodiments, another type of smart contract/governance variable pair is based on a type of governance variable referred to as a "minimal delivered net-metered per period governance variable." This governance variable sets the minimal amount of energy units that a net-metering power consumer entity must deliver per unit period. This variable is set by running a "minimal delivered net-metered per period smart contract," which results in a new transaction on the blockchain carrying the new value for the minimal delivered net-metered per period governance variable. This prevents power consumer entities delivering too little preferred energy back to the local grid (which maybe not be worth the business time/effort of other user(s), such as one or more local distributor entity(ies)).

In some embodiments, another type of smart contract/governance variable pair is based on a type of governance variable referred to as a "minimum confirmed delivered net-metered per period governance variable." This governance variable sets the minimum amount of energy units that a Local Distributor entity must obtain (purchase) per time period from each power consumer entity selling energy back to the grid system managed by the blockchain. This prevents the local distributor entity "ignoring" power consumer entities who are ready to sell back energy (e.g., preferred energy, via net-metering, sourced from a solar panel on a roof). This variable is set by running a "minimum confirmed delivered net-metered per period smart contract," which results in a new transaction on the blockchain ledger carrying the new value for the minimum confirmed delivered net-metered per period governance variable.

Figure 7:
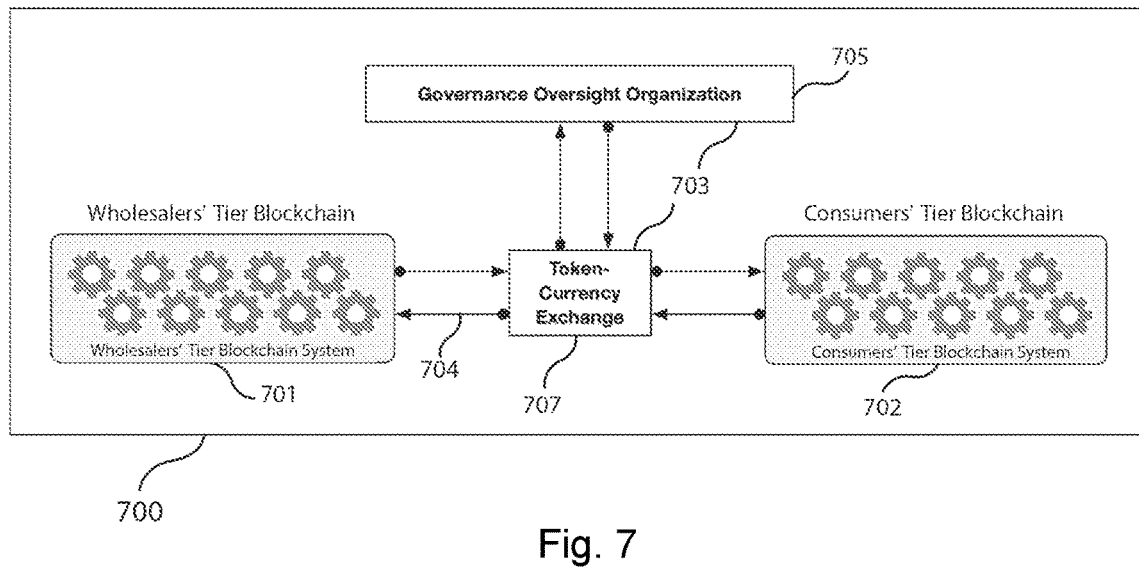
FIG. 7 is a schematic block diagram of another example blockchain system, including a plurality of blockchain subsystems.

FIG. 7 is a schematic block diagram of another example blockchain system 700, including a plurality of blockchain subsystems. As also discussed above, a wholesalers' tier blockchain system 701 and a consumers' tier blockchain system 702 may each be included in a blockchain system 700, in some of the same embodiments, in accordance with aspects of the invention. Two such blockchain systems may be interconnected, in order to balance the production and availability of preferred energy, by different users of such systems (e.g., power consumers, wholesale distributors, and local distributors), with the consumption of preferred energy by power consumers. In some embodiments, such an interconnection is created by bridging entities 703, communicatively connected to each such blockchain system. (An example of such communicative connections is shown as communicative connection 704.) For example, in some such embodiments, such a bridging entity is a governance organization 705, which may be a governing body, in some embodiments, as discussed in this application. As another example, in some embodiments, such a bridging entity is a token-currency exchange 707, as discussed in this application. In some embodiments, a token-currency exchange may be a control system including specialized computer hardware and software, such as the control system set forth above in reference to FIG. 2. In some embodiments, the token-currency exchange may be owned and operated by such a governance organization.

Figure 8:
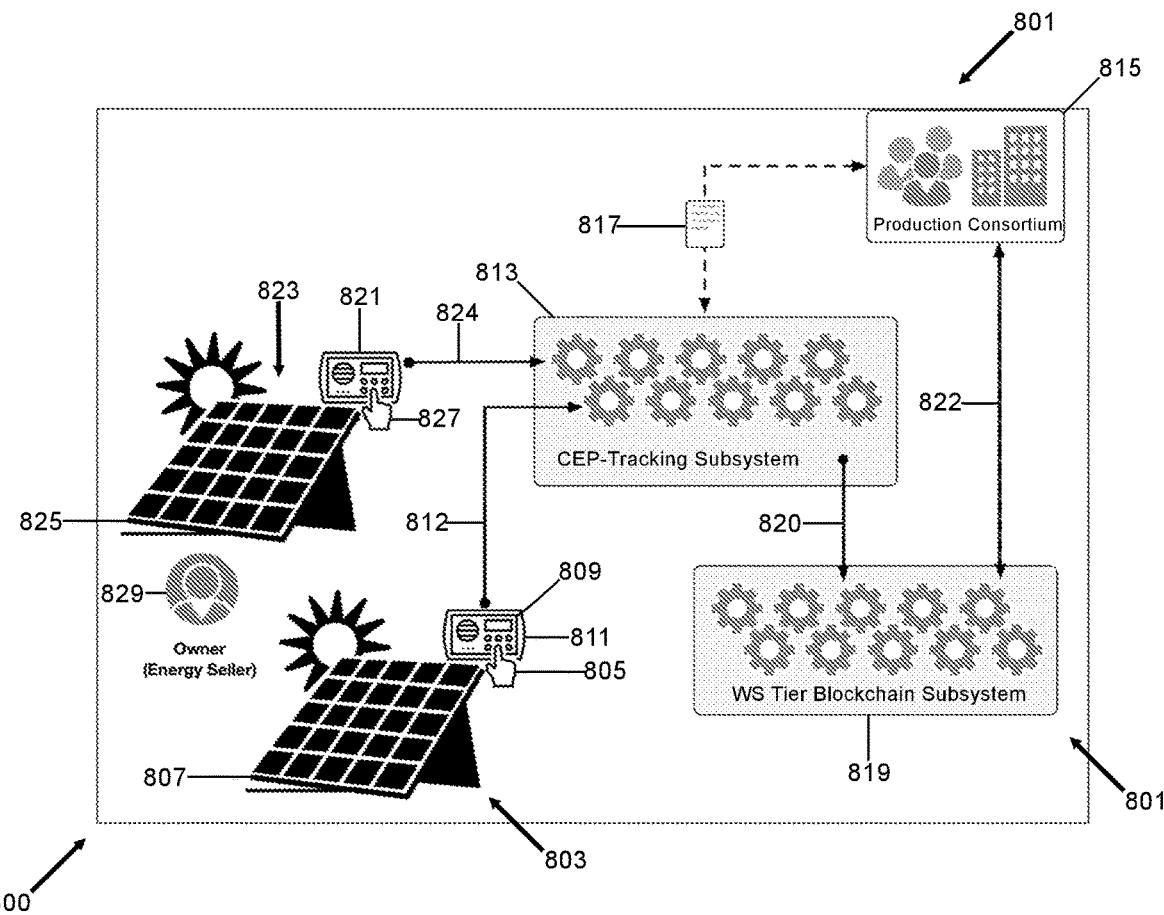
FIG. 8 is a diagram of example systems, devices and methods for managing an energy supply chain within an example energy sourcing and distribution environment, in accordance with embodiments of the invention.

FIG. 8 is a diagram of example systems, devices and methods for managing an energy supply chain within an energy sourcing and distribution environment 800, in accordance with some embodiments of the present invention. One such system is also pictured, as example system 801. As with other systems and devices set forth in this application, the example system 801 and device(s) within system 801, which include each device pictured, may comprise, be comprised within, or otherwise may be implemented with the aid of, a control system including computer hardware and software, such as the example control system(s) set forth with reference to FIG. 2, above.

In accordance with some method embodiments of the invention, as an example, a preferred energy source 803 may been installed by a first user 805 of the control system. In some embodiments, first user 805, and any other user of a system as set forth in the present application, may be one or more human user(s). In some embodiments, however, such a user may be or include a control system(s), including computer hardware and software, of a type such as that set forth in relation to FIG. 2, above. In some embodiments, users may be or may include a legal entity, such as a government, non-government, business or other legally recognized entity. In some embodiments, users may be or may include a consortium or other association of users. In some embodiments, preferred energy source 803 may include clean energy production hardware, such as the pictured example photovoltaic solar energy panel or array 807, which first user 805 may have installed outdoors on a parcel of land. As discussed above, and generally for all users of system 801, first user 805 may have access to a user interface 809 of system 801. In some embodiments, user interface 809 may include a GUI, as further defined in this application. User interface 809 may include hardware and/or software of system 801, presenting tools for the management of any of the methods and operations set forth in this application, including methods related to preventing fraudulent or falsely asserted "preferred energy" or "clean energy" transactions. For example, user interface 809 may include a secure metering device ("SMD"), such as example first SMD 811, in some embodiments. In some embodiments, first SMD 811 is an energy metering device including computer hardware and software, with cryptographic capability(ies). For example, in some embodiments, first SMD 811 includes at least one cryptographic processor (a.k.a., a "crypto-processor"). In some such embodiments, such a crypto-processor is held within a tamper-resistant housing or packaging. In some such embodiments, such a tamper-resistant housing or packaging includes tamper-evident packaging, which reveals whether attempt(s) have been made to enter or otherwise defeat such housing or packaging, and gain access to the crypto-processor(s) within it. In some embodiments, SMDs, such as SMD 811, may include a GUI, such as GUI 809 (as pictured). However, in some embodiments, GUI 809 may be presented on additional computer hardware of system 801 (e.g., a display of local computer subsystem of system 801, owned by user 805.)

In some embodiments, first SMD 811 may monitor and report data regarding the production of energy by the preferred energy source 803. For example, in some embodiments, such an SMD may report data regarding the production of energy from photovoltaic solar energy panel or array 807. In some embodiments, first SMD 811 may track and report such data in conventional energy production/consumption units (e.g., Watts or kilowatts). In some embodiments, such data may be provided as a package of data—e.g., in a data report communicated through system 801 (e.g., to users). For example, in some embodiments, first SMD 811 may report an amount of energy produced by preferred energy source 803 and/or any hardware within preferred energy source 803, over a period of time. In some embodiments, such reports are issued along with related metadata. For example, in some embodiments, such reports are issued along with parameters to a subsystem of system 801. For example, in some embodiments, such reports and such metadata are transmitted to such a subsystem which includes one or more blockchain(s) (a.k.a., a "Clean Energy Production Tracking Blockchain Subsystem" or "CEP-Tracking Subsystem"). Such a transmission is demonstrated by example transmission pathway arrow 812. An example of such a CEP-Tracking Subsystem is provided as CEP-Tracking Subsystem 813. In some embodiments, such reports and/or parameters are digitally signed. In some such embodiments, such digital signing is carried out with cryptographic keys (e.g., using asymmetric cryptography techniques) which are held within first SMD 811, within a crypto-processor, in some embodiments. In some embodiments, CEP-Tracking Subsystem 813 is a permissioned system, meaning that it may only provide particular types of system access to particular users of system 801 who have been authorized for such access. For example, in some embodiments, CEP-Tracking Subsystem 813 may only provide read/write access to such particular users, who have been authorized for such read/write access.

In some embodiments, a consortium or other association of users 815 who are preferred energy producers, and/or producers of particular types of preferred energy (e.g., a consortium of clean energy or green energy producers) may monitor transactions on the CEP-Tracking Subsystem and/or the one or more blockchain(s). In some embodiments, such a consortium or other association may act as a single user or entity. In some embodiments, such a consortium or association may author smart contracts and record them on such blockchains(s) to support transaction(s) or other function(s), task(s) of any users of system 801. For example, in some embodiments, any of the users may create plans related to preferred energy (e.g., clean energy) production and consumption, such as example clean energy plan(s) 817. In some embodiments, such plans related to preferred energy may relate to the provision of preferred energy through a supply chain with the aid of system 801. In some embodiments, such plans related to preferred energy may relate to the provision of clean energy through a supply chain with the aid of system 801.

In some embodiments, system 801 also includes a multiple-tiered blockchain subsystem. For example, in some embodiments, such a multiple-tiered blockchain subsystem includes both: 1) a CEP-Tracking Subsystem, including one or more blockchain(s), such as CEP-Tracking Subsystem 813; and 2) a Wholesalers' Tier Blockchain System 819, also including one or more blockchain(s). In some embodiments, transaction(s) with entities that are wholesale buyers and/or wholesale sellers of preferred energy (e.g., clean energy transactions) are recorded on wholesalers' tier blockchain system 819, and blockchain(s) within it. However, as such transaction(s) are so recorded, in some embodiments, they may "point to" (meaning, their recordings on wholesalers' tier blockchain system 819 contain a cryptographic hash of) data related to the production of preferred (e.g., clean) energy recorded on CEP-Tracking Subsystem 813 (e.g., if those data are related to such a transaction(s)), as demonstrated by cryptographic hashing relationship indicating arrow 820). In this sense, transaction(s) recorded on wholesalers' tier blockchain system 819 may be linked and connected to data related to the production of preferred (e.g., clean) energy subject to the transaction(s), and the nature of the transaction(s) as preferred (e.g., clean) energy transactions may be supported by reliable evidence. In some embodiments, a variety of users (e.g., the wholesale sellers, buyers, or auditors) may then investigate and evaluate the authenticity of transaction(s) as preferred (e.g., clean) energy transaction(s), by reviewing blockchain(s) of Wholesalers' Tier Blockchain System 819. In some embodiments, such users are provided with a GUI for viewing tools relaying data and/or information concerning the nature and/or amount of energy sold by a wholesaler or other seller purporting to sell preferred (e.g., clean) energy. As an example, in some embodiments, such a user is consortium or other association of users 815, and is provided with such a GUI, and may then independently view and validate data regarding energy sold by a seller on the Wholesalers' Tier Blockchain System, as shown by example data and information access connection arrow 822.

In some embodiments, system 801 includes multiple instances and/or types of SMDs, monitoring and recording data and/or information related to preferred energy production by users. For example, in some embodiments, a second SMD 821, similar in nature to first SMD 811, is provided within system 801, and may similarly monitor and report data regarding the production of energy by an additional preferred energy source 823, in the same standard units of consumption/production, and in the same manner, in some embodiments (as shown by example transmission pathway arrow 824). For example, in some embodiments, such an SMD may report data regarding the production of energy from a second photovoltaic solar energy panel or array 825, owned and managed by an additional user 827. As with first SMD 811, second SMD 821 may transmit such data as a package of data—e.g., in a data report communicated through system 801.

In some embodiments, each SMD device that is a part of system 801, and/or connected with and configured for communications with system 801 (e.g., through wired or wireless communications connection(s)) stores at least two (2) types of public/private cryptographic key pairs and certificates. In some embodiments, each of such key pairs are located on trusted computer hardware, within the SMD. For example, in some embodiments, each such SMD includes at least one specialized computer chip(s) holding the cryptographic key pairs. In some embodiments, each SMD is or includes a crypto-processor, as defined in this application. In some such embodiments, such SMD(s) and crypto-processor(s) implement(s) a number of standard cryptographic algorithms (e.g. encryption; digital signatures; hashing; etc.) In some embodiments, such specialized computer chip(s) is based on technical standards for the secure storage and management of public/private cryptographic key pairs. In some embodiments, such trusted computer hardware includes the Trusted Platform Module Chip ("TPM Chip"). In some such embodiments, such a TPM Chip is version 1.2 of the Trusted Platform Module Chip. In some such embodiments, such a TPM Chip is version 2.0 of the Trusted Platform Module Chip. In some embodiments, such trusted computer hardware is based on the TPM Chip or some part thereof. In some embodiments, one or more of the public/private cryptographic key pair(s) is non-migratable, meaning that, in addition to being securely stored (e.g., in an encrypted form) the SMD and/or its crypto-processor is configured to prevent reading, copying, access or removal of that public/private cryptographic key pair(s). In some embodiments, the SMD and/or its crypto-processor is configured to prevent all copying and/or removal of that public/private cryptographic key pair(s), in any form. In some such embodiments, such a configuration is permanent. In some embodiments, those public/private cryptographic key pair(s) are never visible by or through any external processes. Thus, in some embodiments, those public/private cryptographic key pair(s) are restricted to software or other hardware within the SMD device. For example, in some embodiments, a type of "trusted hardware" included within the SMD device (e.g., the Trusted Platform Module chip) generates such cryptographic key pair(s), and such cryptographic key pair(s) are never shared outside of the SMD. In some embodiments, such external processes are external to the SMD and/or crypto-processor. In some embodiments, such external processes are at least partially within the SMD, but external to particular processes designated "internal." In some embodiments, any data requiring a digital signature, in accordance with rules implemented in computer hardware and software of system 801, with a private key of such a public/private key pair(s), is passed into the SMD/crypto-processor. In some embodiments, such data is so passed using standard Application Programming Interfaces ("APIs"). In some embodiments, such data is so passed in an encrypted form (e.g., by cryptographic hash). Output from the SMD and/or crypto-processor is then in a data structure signed by that private key of such a public/private key pair(s).

In some embodiments, cryptographic keys of the SMD device(s) may include any of the following, in any possible order, number or other arrangement (the following order, components and/or relationships being non-limiting):

In some embodiments, the public/private key pair(s) of the SMD include a "Device Identification Key Pair," which is a public/private asymmetric cryptography key pair used by the SMD on which it relates, and on which it is stored, to uniquely identify that SMD to users of system 801, other components of system 801, and other hardware, and/or any entity(ies) other than the SMD. In this sense, the Device Identification Key Pair is a unique identifier, in addition to serving as a public/private key pair. In some embodiments, the Device Identification Key Pair is used by specialized computer hardware and software which creates a secure channel for communications with the SMD, and any of those entity(ies). For example, in some such embodiments, such a secure channel is created based on standard protocols (e.g., the standard known as TLS 1.3, created by the Internet Engineering Task Force, in some embodiments). As with other public/private key pairs set forth in this application, in some embodiments, the Device Identification Key Pair is non-migratable in some embodiments. In some embodiments, the SMD prevents the reading, copying, access and/or removal of the Device Identification Key Pair by any of those entity(ies) and any external process(es). In some embodiments, a digital certificate, called a "Device Identification Certificate," is also included within the SMD. In some embodiments, the Device Identification Certificate includes an envelope containing the public key of the Device Identification Key Pair. In some such embodiments, the Device Identification Certificate is signed (e.g., by the manufacturer of the SMD.) In some embodiments, such a Device Identification Certificate is a standard X509 certificate. In some embodiments, the Device Identification Certificate is used to authenticate the SMD, related power generation hardware, and any preferred energy (e.g., clean energy), and data related thereto, managed by the SMD and/or produced by that power generation hardware. In some embodiments, such authentication relates to establishing the fact that the SMD is a genuine product created by the manufacturer. In some embodiments, such authentication relates to establishing the type of such energy so produced. In some embodiments, such authentication relates to establishing the fact that the energy so produced is preferred energy (e.g., clean energy).

In some embodiments, the public/private key pair(s) of the SMD include a "Device Transaction Signing Key Pair," which is a public/private asymmetric cryptography key pair used by the SMD on which it relates, and on which it is stored, to sign transactions destined for a blockchain(s). In some embodiments, such transactions relate to preferred energy generated by hardware associated with the SMD. As with other public/private key pairs set forth in this application, in some embodiments, the Device Transaction Signing Key Pair is non-migratable in some embodiments. In some embodiments, the SMD prevents the reading, copying, access and/or removal of the Device Transaction Signing Key Pair by any of those entity(ies) and any external process(es). In some embodiments, a digital certificate, called a "Device Transaction Signing Certificate," is also included within the SMD. In some embodiments, the Device Transaction Signing Certificate includes an envelope containing a cryptographic hash of the public key of the Device Transaction Signing Key Pair. In some such embodiments, the Device Transaction Signing Certificate is signed (e.g., by the manufacturer of the SMD.) In some embodiments, such a Device Transaction Signing Certificate is a standard X509 certificate. In some embodiments, the Device Transaction Signing Certificate is used to authenticate the SMD, related power generation hardware, and any preferred energy (e.g., clean energy), and data related thereto, managed by the SMD and/or produced by that power generation hardware. In some embodiments, such authentication relates to establishing the fact that the SMD is a genuine product created by the manufacturer. In some embodiments, such authentication relates to establishing the type of such energy so produced. In some embodiments, such authentication relates to establishing the fact that the energy so produced is preferred energy (e.g., clean energy). In some embodiments, the Device Transaction Signing Certificate includes a cryptographic hash of the public key of the device identification public/private key pair. In some such embodiments, any recipient of the Device Identification Certificate and the Device Transaction Signing Certificate can ascertain that the certificates are authenticated, and belong to the particular, related SMD.

In some embodiments, system 801 makes both the Device Identification Certificate and the Device Transaction Signing Certificate available to any users of system 801, other components of system 801, and other hardware, and/or any other entity(ies) related to system 801 and/or the relevant SMD. For example, in some such embodiments, both the Device Identification Certificate and the Device Transaction Signing Certificate are made available to consortium or other association of users 815. In some embodiments, the Device Identification Certificate and/or the Device Transaction Signing Certificate are made available as a copy placed on a blockchain(s). In some embodiments, the Device Identification Certificate and/or the Device Transaction Signing Certificate are made available as a copy placed on a server owned by the relevant entity(ies) (e.g., for a website owned by consortium or other association of users 815).

In some embodiments, in order to use one or more of the non-migratable public/private key pairs, such as a Device Identification Key Pair or the Device Transaction Signing Key Pair, held within an SMD (e.g., SMD 811) and/or its crypto-processor, a user, such as example first user 805, must be physically present at the SMD. In some such embodiments, such a user must also gain secure access to the SMD. For example, in some embodiments, specialized software running on computer hardware of the SMD requires the user to enter a secret value (e.g., a secure login username and password) and/or carry out other security and authentication steps, entered on a GUI of the SMD, such as GUI 809) before the user may activate the SMD and use the non-migratable public/private key pairs to send data, reports, certificates and otherwise manage the provision of preferred energy through the SMD and system 801.

In some embodiments, the SMD, such as SMD 811, is physically secured to or physically integrated with energy production hardware, such as the pictured example photovoltaic solar energy panel or array 807. In some such embodiments, the SMD is secured to and/or physically integrated with tampering sensor(s) communicatively connected with computer hardware of the SMD which, when such sensor(s) is/are activated, detect and report a tampering-related signal to a control system of the SMD (which may be a control system such as the control system set forth in reference to FIG. 2, above) and trigger the computer hardware to erase all public/private key pairs held within the SMD and/or crypto-processor. In some embodiments, such tampering sensors also may trigger the destruction and/or secure removal of other data on the SMD. In some embodiments, a crypto-processor, within the SMD, with an independent on-board power source (e.g., a battery and/or capacitor) is so secured to and/or physically integrated with tampering sensor(s). In some embodiments, such sensor(s) include, or are included within, an electrically-conductive casing supplied with a low-voltage current in a tampering detection circuit of the crypto-processor. In some such embodiments, such tampering sensor(s) detect and report tampering, triggering the actions set forth above related to tampering sensor(s), when a physical insult (e.g., a scratch on the surface of the casing) alters the conductive properties of the casing, the tampering sensor(s) activate as a response to tampering, as reported above.

In some embodiments, SMDs may be owned by one or more users of system 801, such as a user who is a preferred (e.g., clean) energy seller. In some such embodiments, such a preferred (e.g., clean) energy seller is the owner of such as example clean energy production hardware, such as the pictured example photovoltaic solar energy panel or array 807. In some such embodiments, such an SMD may be physically attached to or integrated with such clean energy production hardware, and uniquely identifies the owner, such as example owner/preferred energy seller 829, and authenticates data related to, and the status of, preferred (e.g., clean energy) provided through system 801, as discussed in this application (e.g., via the different key pairs and certificates discussed above).

Figure 9:
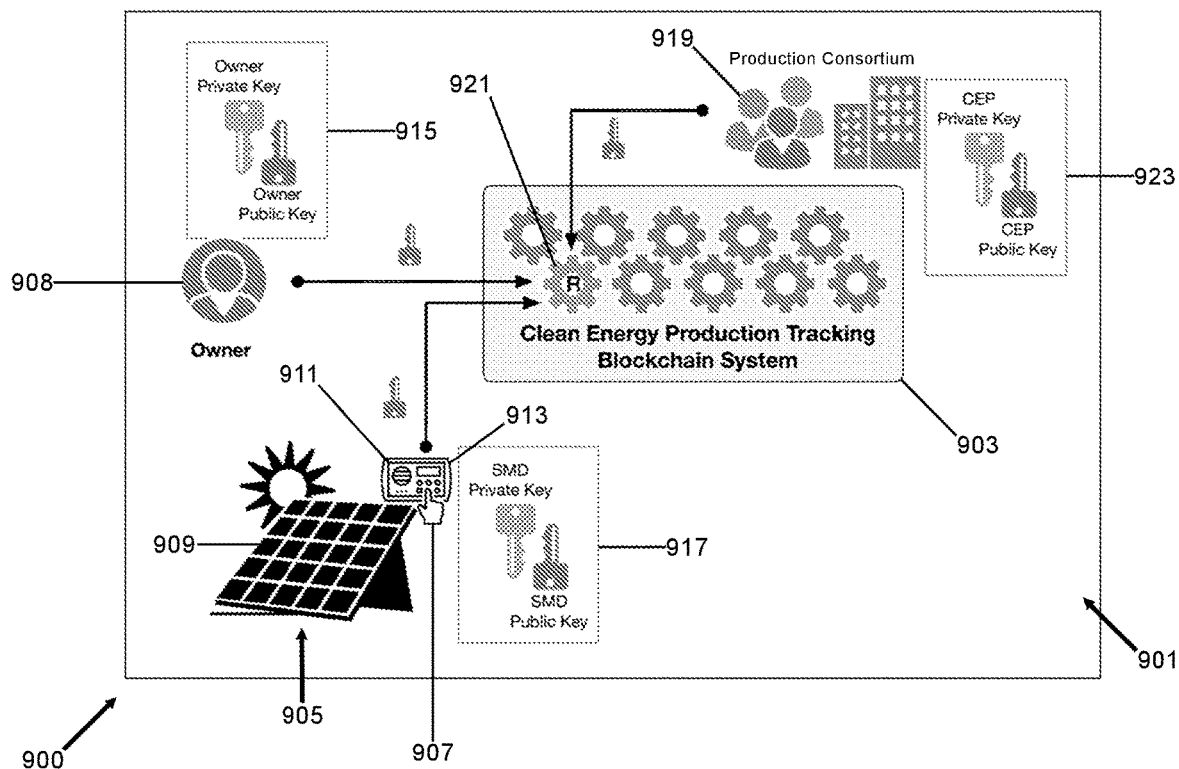
FIG. 9 is an example diagram of additional example systems, devices and methods for managing an energy supply chain within another example energy sourcing and distribution environment, in accordance with some embodiments of the invention.

FIG. 9 is a diagram of additional example systems, devices and methods for managing an energy supply chain within an example energy sourcing and distribution environment 900, in accordance with some embodiments of the invention. One such system is also pictured, as example system 901, which has the same types of components and/or the same components as set forth above in system 901, in some embodiments. As with other systems and devices set forth in this application, the example system 901 and device(s) within system 901, which include each device pictured in FIG. 9, may comprise, be comprised within, or otherwise may be implemented with the aid of, a control system including computer hardware and software, such as the example control system(s) set forth with reference to FIG. 2, above. In some embodiments of such methods, public keys and/or public/private key pairs, such as any of the public keys and/or public/private key pairs set forth in this application, may be registered for use in tracking production, transactions and/or distribution of preferred (e.g., clean) energy through system 801. As explained above, in some embodiments, system 801 includes a Clean Energy Production Tracking Blockchain Subsystem or "CEP-Tracking Subsystem," such as example CEP-Tracking Subsystem 813, as provided in reference to FIG. 8 above. Similarly, system 901 includes at least one such CEP-Tracking Subsystem, namely—example CEP-Tracking Subsystem 903, as pictured in the present figure. Also similarly to CEP-Tracking Subsystem 813, CEP-Tracking Subsystem 903 may include one or more blockchain(s), in some embodiments, configured to record data and transactions relevant to the production and tracking of preferred (e.g., clean) energy. Among other things, FIG. 9 illustrates some additional methodological, device and system elements, relevant to the registration of such public keys and or public/private key pairs. As with system 801, system 901 includes at least one preferred energy source in some embodiments, such as example clean energy source 905, which may be installed and owned by a new user 907 of the control system, who may also be an owner 908 of clean energy production hardware, in some embodiments. In some embodiments, clean energy source 905 may include such clean energy production hardware, such as the pictured example photovoltaic solar energy panel or array 909, which new user 907, as an owner of the clean energy production hardware, may have installed outdoors on a parcel of land. New user 907 may have access to a user interface 911 of system 901. In some embodiments, user interface 911 may include a GUI, as further defined in this application. User interface 911 may include hardware and/or software of system 901, presenting tools for the management of any of the methods and operations set forth in this application, including methods related to preventing fraudulent or falsely asserted "preferred energy" or "clean energy" transactions. For example, as with other similar user interfaces set forth in this application, user interface 911 may include a secure metering device ("SMD"), such as example new SMD 913, in some embodiments. In some embodiments, new SMD 913 is a device including computer hardware and software, with cryptographic capability(ies), such as a crypto-processor.

In some embodiments, system 901 authenticates owners of clean energy production hardware. For example, in some embodiments, system 901 authenticates such an owner(s), at least in part, by verifying that the owner(s) of clean energy production hardware and/or an SMD associated therewith possess a public/private key pair(s), such as example owner-identifying key pair 915. For example, in some embodiments, system 901 conducts such authentication by verifying that the owner(s) possess a valid Device Identification Key Pair, or the public key of that key pair, as discussed above—such as example Device Identification Key Pair 917. As discussed above, in some embodiments, such a public key may be held within a Device Identification Certificate, as further described above. In some such embodiments, the system 901 may so verify such an owner as an owner of clean energy production hardware and/or an SMD associated therewith by requesting, receiving, reading, analyzing and/or validating such a Device Identification Certificate. In some embodiments, the system 901 may so verify such an owner as an owner of clean energy production hardware and/or an SMD associated therewith by determining, based on such a public key and/or such a Device Identification Certificate, whether the owner is legally identified as the owner of clean energy production hardware, or particular clear energy production hardware transmitting clean energy to the system 901. In some embodiments, such a verification and identification may be based on decoding and analyzing the contents of the Device Identification Certificate and/or the public key. In some embodiments, system 901 conducts such authentication by verifying that the owner(s) possess another form of valid public/private key pair(s), or the public key of that key pair. And, in some embodiments, such a public key may be held within another type of digital certificate. In some embodiments, the system 901 may so verify such an owner as an owner of clean energy production hardware and/or an SMD associated therewith by determining, based on such a public key and/or such a certificate, whether the owner is legally identified as the owner of clean energy production hardware and/or an SMD associated therewith, or particular clear energy production hardware transmitting clean energy to the system 901. In some embodiments, such a verification and identification may be based on decoding and analyzing the contents of the certificate and/or the public key. In some embodiments, the Device Identification Certificate, and/or, if applicable, other form of certificate, is issued by an agent and/or entity which is authorized to issue the certificate(s) (a.k.a., a "Certification Authority" or "CA"), such as the example shown as production consortium 919, which is also a consortium of users of system 901. In some embodiments, such a CA is a "Commercial CA," meaning that the CA receives money or other incentives for providing such certificate(s). As discussed above, in some embodiments, such clean energy production equipment is a soft energy production device, such as a solar power generation device, with solar panels. And, also as discussed above, in some embodiments, such an SMD device may be attached to and/or integrated with such clean energy production equipment. In some embodiments, the owner and/or another responsible party employs one or more secure mechanism(s) (e.g., mobile device with a tamper-resistant chip, a protective housing, tamper-evident seals and/or sensors, as set forth above) to store and use any of the public keys and/or public/private key pairs discussed above. In some embodiments, such a secure mechanism includes a tamper-resistant housing and/or chip (e.g., including tamper-evident and/or tamper-resistant seals and/or sensors, such as those set forth above), which may house, protect and/or seal an SMD device, in some embodiments. In some embodiments, such an SMD device and secure mechanism may be fastened to hardware to which it relates (e.g., clean energy generation hardware). In some embodiments, such secure mechanisms secure such public keys and/or public/private key pairs from theft and or misuse by other parties, while allowing the user (who may be authenticated by the system 901, in some embodiments) to use the public keys and/or public/private key pairs. In the event that the public keys and/or public/private key pairs are public keys and/or public/private key pairs other than the Device Identification Key Pair, in some embodiments, the corresponding private key of that public key and/or public/private key pair may be such a mobile device with a tamper-resistant chip. In some such embodiments, the owner may use that private key as input into system 901 in a registration process, for registering the SMD with the system 901, meaning that a unique, identifying record for the SMD and/or clean energy production hardware to which it is attached, or with which it is integrated, is stored on computer hardware of the system 901. In some such embodiments, the SMD registration is, at least in part, based on the owner so using such a private key as described above. For example, in some embodiments, the SMD registration is not carried out for that owner, unless that owner so uses her or his private key.

In some embodiments, any of the above-described SMD registrations may a prerequisite for the SMD to report energy production by the clean energy production hardware attached thereto or integrated therewith, and/or data related thereto (e.g., a number of energy units produced by that hardware), to or through system 901. Because the SMD and that clean energy production hardware are associated (e.g., physically attached to one another) the system 901 assumes that the reported energy production and data related thereto are of the clean energy production hardware, in some embodiments. Furthermore, in some embodiments, the owner of the SMD and/or clean energy production hardware is also identified, and such reported energy production and data are linked or otherwise associated by system 901 (e.g., in a memory record, of system 901's computer hardware and/or software) with a unique identifier for that owner. In some embodiments, a single owner may own multiple SMDs, and multiple sets or units of clean energy production hardware, each integrated with one of the SMDs. However, preferably, in such cases, that owner must separately register each such set or unit, each associated SMD bearing a unique public/private key pair, and each registration generating a unique identifier of the SMD and/or the associated clean energy production hardware.

In some embodiments, any registration process set forth above may also be based, at least in part, on a smart contract, known as a "Device Registration Smart Contract," recorded on a blockchain(s), such as any of the example blockchain(s) set forth in the present application (e.g., example blockchain 921). In some embodiments, such a Device Registration Smart Contract is authored and signed by a consortium or other association of users, such as any of the consortium or other association of users discussed above, and/or the example production consortium 919. In some embodiments, any user of system 901 may then review such a blockchain(s) and view such smart contract(s) and validate their origins. In some embodiments, any such user may also validate any SMD and clean energy production hardware associated therewith, by consulting the Device Registration Smart Contract, which stores that information as well, during a Device Registration Smart Contract process.

In some embodiments, the Device Registration Smart Contract process incorporates and/or records at least one of the following inputs: A) a public key of a public/private key pair of the owner, such as any of the owner's public/private key pairs set forth above; and B) the public key of a Device Transaction Signing Key Pair held on an SMD of the owner. In some embodiments, Device Registration Smart Contract process incorporates and/or records both of those inputs. In some embodiments, an output of the smart contract is a transaction on the blockchain that records a relationship between the Owner's public-key and the public key of a Device Transaction Signing Key Pair. For example, in some embodiments, a record of the smart contract places both the public key of a public/private key pair of the owner and the public key of a Device Transaction Signing Key Pair (A & B, above) alongside one another in the same record. In addition, in some embodiments, at least part of a public/private key pair of the consortium or other association of users, such as example CEP public/private key pair 923, is used to sign the smart contract (e.g., using the private key of the public/private key pair). In this sense, the consortium or other association of users acts as a trusted, validating third party, enhancing the security of the smart contract process.

As discussed above, in some embodiments, the SMD device is physically fastened to or integrated with (e.g., soldered or otherwise fastened or connected to) particular clean energy production hardware. And, in some embodiments, additional physical tamper-detection may be incorporated into the SMD in some embodiments. As a result, in some such embodiments, any attempt to tamper with the SMD may result in a failure (automatic shutdown) of the SMD, in addition to other possible method steps, as set forth in this application. In some embodiments, periodically (e.g., once per hour) the SMD device will log power output to system 901 of that clean energy production hardware (e.g. a solar panel). As mentioned above, such logging may be made in a common denomination (e.g., watts per hour) to the CEP-Tracking Subsystem 903 blockchain(s). In some embodiments, such logging may be carried out as a transaction known as a "Clean Energy Generated (CEG) Transaction." In some embodiments, such a transaction is transmitted by the SMD, and, in some embodiments, includes a record of the following parameters related to the transaction and/or clean energy subject to the transaction (e.g., in the body of the transaction):

The public key of the Device Transaction Signing Key Pair of the SMD attached to or integral with the hardware generating the clean power (a.k.a., an "Origin Address");

The public key of a public/private key pair of the owner of the hardware generating the clean energy (who registered the device previously) (a.k.a., the "Destination Address" or "Owner's Address");

The type of clean energy generated (a.k.a., the "Transaction type" or "CEG");

The amount of clean energy generated, in a unit denomination (e.g. Watts and/or Kilowatts) (a.k.a., the "Power Generated");

The time(s) of day and date(s) at the SMD when the clean energy was generated (a.k.a., the "Origin Timestamp"); and A digital signature created using a private key of the SMD device (a.k.a., the "Digital Signature of the SMD device").

In some embodiments, any one of the SMD(s) connected with or included in system 901 may periodically report a state of that SMD to system 901, where it may be recorded on a blockchain(s) (e.g., any blockchain(s) within CEP-Tracking Subsystem 903, in some embodiments). For example, in some embodiments, such an SMD may so periodically report an internal system state. As another example, in some embodiments, such an SMD may report a state of computer hardware, firmware and/or software within the SMD. As another example, in some embodiments, such an SMD may report a state of a crypto-processor. In some embodiments, such reporting of a state may be periodic. For example, in some embodiments, such reporting of a state may be once per every 7 seconds. As another example, in some embodiments, such reporting of a state may be once per every 14 seconds. As another example, in some embodiments, such reporting of a state may be once per every 2 hours. Once recorded to the blockchain(s), in some embodiments, any users of system 901 may then review those blockchain(s) to determine information regarding the composition of the SMD(s) that so record any of the state information set forth above. In some embodiments, particular users may be provided with such access to review such information. For example, in some embodiments, the owner of the SMD and related clean energy production hardware may review such information. As another example, in some embodiments, the owner of the SMD and related clean energy production hardware may review such information. As another example, in some embodiments, a consortium or other association of users, such as any of the consortium or other association of users discussed above, may review such information. Such review may be exercised to aid in oversight of updates (e.g., by the owner) and other changes to SMD hardware, software and/or firmware, in some embodiments. In some embodiments, the blockchain(s) with such information recorded on them thus include a history of versions of software, firmware and hardware of SMD(s) within system 901. In some embodiments, such a history can be used to resolve disputes between users of system 901, and/or other parties. For example, in some embodiments, such a history can be used to resolve disputes between an owner of clean energy production hardware and a consortium or other association of users, such as those discussed above. In some embodiments, such a consortium or other association of users may use such a history as evidence supporting energy transactions conducted with or through a wholesalers' tier blockchain system, such as Wholesalers' Tier Blockchain System 819. For example, in some embodiments, such a consortium or other association of users may use such a history as evidence that the consortium or other association of users is actually generating and producing clean energy.

Figure 10:
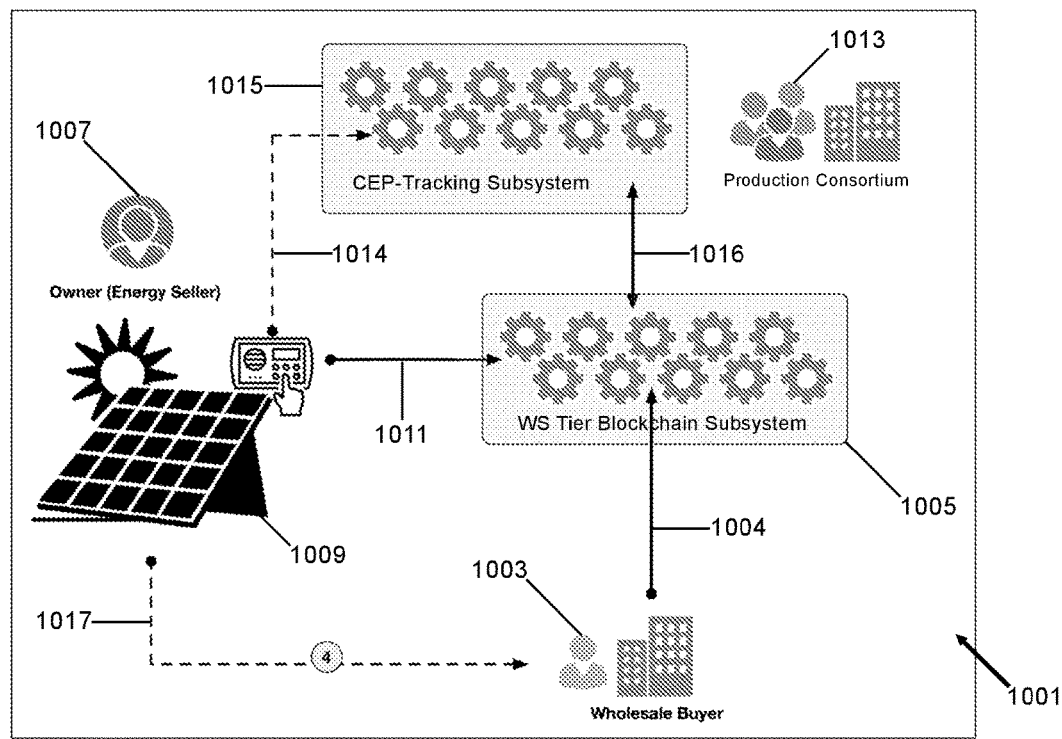
FIG. 10 is a diagram of example systems, devices and methods for managing wholesale energy transactions, among other aspects, within another energy sourcing and distribution environment, in accordance with some embodiments of the invention.

In some aspects of the invention, certain users of system 901 may seek to purchase clean energy from clean energy producer(s), such as certain owners of clean energy producing hardware, as discussed above (e.g., solar panel owner/user 805 or 908). For example, in at least some instances, wholesale buyer(s) may so seek to purchase clean energy from clean energy producer(s). Accordingly, FIG. 10 is an example diagram of elements of systems, devices and methods for managing wholesale energy transactions, among other aspects, within another energy sourcing and distribution environment 1000, in accordance with some embodiments of the present invention. One such system is also pictured, as example system 1001, which has the same types of components and/or the same components as set forth above in systems 801 and/or 901, in some embodiments. As with other systems and devices set forth in this application, the example system 1001 and device(s) within system 1001, which include each device pictured in FIG. 10, may comprise, be comprised within, or otherwise may be implemented with the aid of, a control system including computer hardware and software, such as the example control system(s) set forth with reference to FIG. 2, above.

In some embodiments, as demonstrated by FIG. 10, when a wholesale buyer, such as example wholesale buyer 1003, seeks to purchase clean energy, the wholesale buyer carries out a clean energy sales transaction (as exemplified by communications arrow 1004) on a Wholesalers' Tier Blockchain System 1005, which, in some embodiments, may be the same or a similar Wholesaler's Tier Blockchain System as set forth previously in this application—such as example Wholesaler's Tier Blockchain System 819. In some embodiments, such a sales transaction is carried out in conjunction with a wholesale seller, such as example owner 1007 of a preferred energy source including clean energy production hardware (e.g., the example photovoltaic solar energy panel or array 1009). In some embodiments, as demonstrated by example communications arrow 1011, the wholesale seller publishes tokens relating to the sales transaction (a.k.a., "Clean Energy Tokens" or "CET") on a blockchain(s) of a subsystem of system 1001 (namely, Wholesalers' Tier Blockchain Subsystem 1005). In some embodiments, the wholesale seller is required to so publish such Clean Energy Tokens, in a number and/or amount corresponding with the amount of clean energy traded in the sales transaction. In some embodiments, the value of each of such Clean Energy Tokens (the "Token Value") is based on a fixed amount of clean energy. In some embodiments, a consortium or other association of users, such as example production consortium 1013, may determine the amount of energy signified by each of such Clean Energy Tokens (e.g., by determining the Token Value as a number of units of energy represented by each such token, such as association 1 token equaling 100 KWh, and creating a recording of that value on any of the blockchain(s) within system 1001). In some embodiments, CETs are or include a list of all clean energy currently available for purchase from the wholesale seller issuing them. In some embodiments, once the CETs have been purchased, their ownership is transferred through transactions to the wholesale buyer's public-key on the Wholesalers' Tier Blockchain Subsystem 1005. The wholesale buyer may provide payment to the wholesale seller through the Wholesalers' Tier Blockchain System 1005, and the wholesale seller may issue a receipt for the same on that payment, also on the Wholesalers' Tier Blockchain System 1005, in some embodiments. In some embodiments, the wholesale buyer is required to so provide payment, and/or the wholesale seller is required to so issue such a receipt. For example, in some embodiments, the system may not record particular information and/or types of information, on a blockchain(s), if such payment and/or a receipt are not so provided or issued. As another example, in some embodiments, the system may not and/or provide particular privileges to the party failing to so provide such a payment or issue such a receipt. In some embodiments, such a receipt may be used to support a dispute initiated by the wholesale seller or the wholesale buyer. For example, if a clean energy deal for which such a receipt has been issued does not close, meaning that the energy is not delivered or not acknowledged as delivered, or allegedly does not close, in some embodiments, the wholesale seller or the wholesale buyer may then initiate such a dispute with the consortium. In some embodiments, such disputes are managed by a system or process separate from system 1001—for example, in a court or alternate dispute resolution forum. However, in some embodiments, disputes may be managed by a process run within, or with the aid of, system 1001. For example, in some such embodiments, smart contracts and tokens may be created and recorded based on such receipts and/or any of the certificates set forth in this application which are managed by a set of rules (e.g., governance variables) maintained by the consortium for resolving such disputes. As one example of such a rule, in some embodiments, a governance variable known as a "dispute resolution governance variable" may set parameters controlling the issuance and recording of a smart contract known as a "dispute resolution smart contract," and/or tokens, which dispute resolution smart contract and/or token may contain a resolution of such a dispute (e.g., outcome upholding the transaction as a verified clean energy transaction, and holding the wholesale seller responsible, and in breach of, an obligation to provide clean energy to the wholesale buyer). In some embodiments, the consortium may alter such rules (e.g., governance variables) periodically, to improve the dispute resolution process.

However, in some embodiments, the wholesale buyer obtains a validation that the energy subject to the clean energy sales transaction is clean energy, and, in some embodiments, prior to being required by the system 1001 to provide such a payment. In some embodiments, such a validation is carried out by such a wholesale buyer calling a new form of smart contract, known as a "Clean Source Verification Smart Contract" (e.g., recorded and called on a blockchain(s) of the Wholesalers' Tier Blockchain Subsystem 1005). In some embodiments, such calling is a read-only function carried out with computer hardware and software of system 1001, meaning that records of the Clean Source Verification Smart Contract on such blockchain(s) are not altered during such call. In some embodiments, however, such calling may involve creating or altering a record of the call in the Wholesalers' Tier Blockchain Subsystem, the CEP Tracking Subsystem 1015, or elsewhere in system 1001 (e.g., to record that the call occurred, and/or a state of the blockchain(s) at that time). To manage such read-only functions, in some embodiments, the system only permits a user (e.g., a wholesale buyer) to engage in such calling if he or she has logged in to the system through an authentication routine, and an account for that user is maintained which positively identifies the user and tracks and controls all of that user's activities on the system (e.g., via system access control methods). In some embodiment, such an account includes a set of privileges, rules and/or other parameters maintained on the system relative to the user permit read-only access for that user, and not any writing, deleting, appending or other data-destructive operations for that user. In some embodiments, the Clean Source Verification Smart Contract includes a function looking up other clean energy related transactions (a.k.a., "CEG Transactions") carried out and recorded (as shown by communications arrow 1014) on CEP-Tracking Subsystem 1015 blockchain(s), which subsystem may be the same as or similar in nature to CEP Tracking Subsystem 903, discussed previously), based on any SMDs belonging to the wholesale seller (owner 1007). Such a function is exemplified by communications arrow 1016. In some embodiments, the Clean Source Verification Smart Contract includes a function looking up all other such transactions. Since each such SMD is registered by the wholesale seller (as the owner of the SMDs), such a smart contract is configured to locate all the CEG transactions by looking up all SMDs registered to a public key of the wholesale seller used to register the SMDs. In some embodiments, the wholesale buyer and/or the system 1001 also scans through all CEG Transactions carried out on the CEP-Tracking Subsystem blockchain(s) based on any SMDs belonging to the wholesale seller. By reviewing all records of those CEG Transactions on the Wholesalers' Tier Blockchain Subsystem, among other functions in some embodiments, the system 1001 and/or the wholesale buyer then sum up all the clean-energy tokens the wholesale seller has sold. In some embodiments the system 1001 and/or the wholesale buyer then subtract the clean energy sold by the wholesale seller from the energy the Seller is selling/claims to be available at the time of a clean energy transaction between that wholesale seller and wholesale seller. In some embodiments, such a precise subtraction may be omitted, in favor of a step where the system 1001 and/or the wholesale buyer instead compare the clean energy sold by the wholesale seller from the energy the Seller is selling/claims to be available at the time (as indicated by the number of CETs available from the wholesale seller on the Wholesalers' Tier Blockchain System 1003). In some embodiments, any discrepancy between the clean energy sold by the wholesale seller and the energy the wholesale seller is selling/claims to be available at the time may be detected by the wholesale buyer and reported to the production consortium 1015, which may then take additional measures (e.g., request revision of the wholesale seller's advertising claims, probationary revocation of privileges to engage in clean energy transactions, etc.) to prevent similar discrepancies in the future.

Ultimately, if a CEG Transaction is verified in accordance with the methods set forth above, and payment from the wholesale buyer 1003 has been made to the seller (owner 1007), clean energy in accordance with amounts purchased and recorded within smart contracts recorded on blockchain(s) within system 1001 may then be routed from the wholesale seller and delivered to wholesale buyer 1003 for consumption, as indicated by example transmission/communications arrow 1017.

Figure 11:
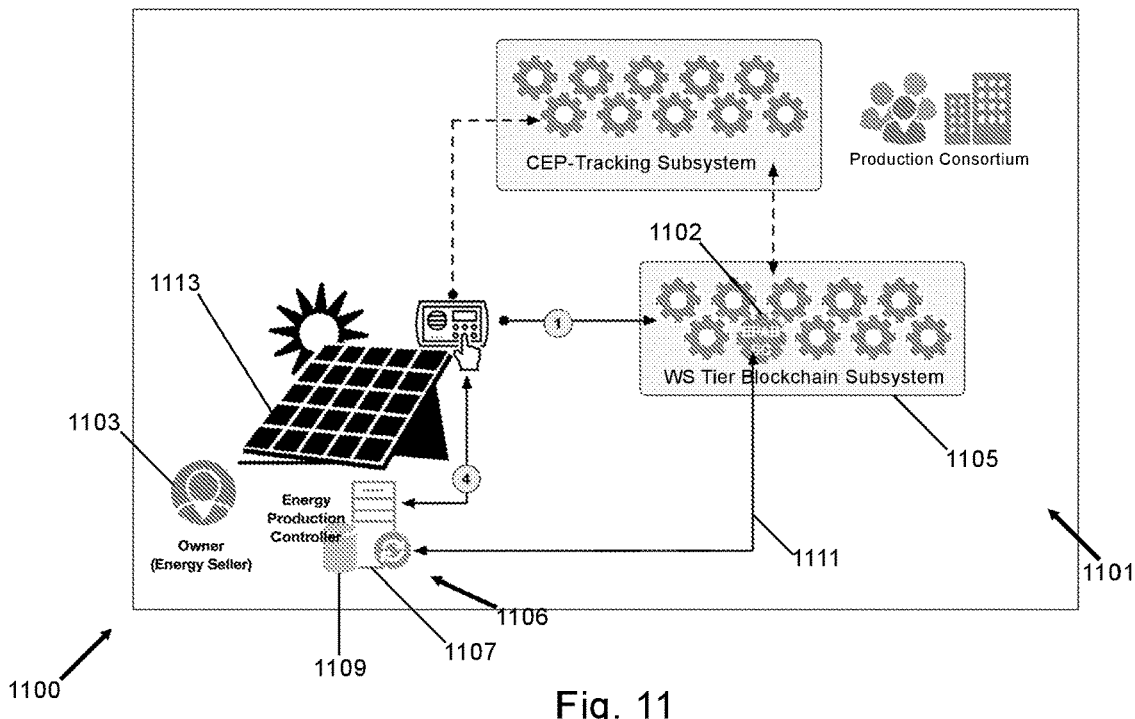
FIG. 11 is a diagram of example systems, devices and methods for managing wholesale energy transactions similar to those referenced above, in FIG. 3, within another example energy sourcing and distribution environment, and including additional subsystems, devices and methods for reconciling data and information related to clean energy transactions after they occur, in accordance with some embodiments of the invention.

FIG. 11 is an example diagram of elements of systems, devices and methods for managing wholesale energy transactions similar to those set forth above, within another energy sourcing and distribution environment 1100, with additional systems, devices and methods for reconciling data and information related to clean energy transactions, after they occur, in accordance with some embodiments of the present invention. One such system is also pictured, as example system 1101, which has the same types of components and/or the same components as set forth above in systems 801, 901, and/or 1001 in some embodiments. As with other systems and devices set forth in this application, the example system 1101 and device(s) within system 1101, which include each device pictured in FIG. 11, may comprise, be comprised within, or otherwise may be implemented with the aid of, a control system including computer hardware and software, such as the example control system(s) set forth with reference to FIG. 2, above. As discussed above, users of systems in accordance with some aspects of the invention, such as wholesale sellers of clean energy (e.g., wholesale seller/owner 1103, shown using system 1101), have access to the Wholesalers' Tier Blockchain Subsystem 1105 of system 1101, in some embodiments. As a result of that access, such users (e.g., wholesale sellers) and/or system 1101 are able to access, read and perform functions on data related to demand for clean energy in the wholesale clean energy market managed by system 1101, in some embodiments. For example, in some embodiments, such users (e.g., wholesale sellers) are able to access, read and perform functions on data related to the rise and/or fall in demand for clean energy in that wholesale clean energy market in some embodiments (e.g., data related to the units of energy sold in clean energy transactions, prices for those units, and the volume of clean energy transactions in the wholesale clean energy market). In some embodiments, any of the above access, reading, and functions may be facilitated by a specialized GUI, presented by system 1101 (e.g., by computer hardware and software within system 1101, accessible to such users). Therefore, in some embodiments, the system and/or such users may monitor and analyze fluctuations of prices in the wholesale clean energy market. In some embodiments, a new type of smart contract, known as the "Energy Production Balancing Smart Contract" (a.k.a., an "EPB Smart Contract"), illustrated by EPM Smart Contract recording 1102) is created, based on this market information. In some embodiments, an EPB Smart Contract is a type of smart contract recorded on a blockchain of system 1101 (e.g., within Wholesalers' Tier Blockchain Subsystem 1103), which provides data and/or information regarding clean energy transactions to the wholesale seller(s). Because some of these data may relate to clean energy and transactions that the wholesale seller(s) has conducted, the EPB Smart Contract can also be thought of as a type of "Feedback Smart Contract," as that term may be used in this application. In some embodiments, an EPB Smart Contract may provide data and information related to such a wholesale seller's production facility, as feedback, in a specialized GUI provided on computer hardware of the control system 1101 (e.g., an "Energy Production Controller" computer (a.k.a., an "EPC" computer), pictured as EPC computer 1106, and which may include remote computer terminal 1107, controlling an energy production controller 1109 at the production facility). Such provision of data and information is exemplified by communications arrow 1111.

In some embodiments, an EPB Smart Contract performs a search through all historical sales of clean energy tokens (CET) that are recorded on the Wholesalers' Tier Blockchain Subsystem 1105. In some embodiments, an EPB Smart Contract performs a search through all currently available CETs that have not yet been purchased. In some embodiments, an EPB Smart Contract performs a search through all currently available CETs, that have, and that have not, been purchased. Based on data and/or information found and recorded in any of the above searches, the EPB smart contract(s) may then relay data, information and parameters to the wholesale seller(s) within a GUI on computer hardware and software connected with, and a part of, system 1101 (e.g., a remote terminal at the wholesale seller(s) production facility). Some example steps in accordance with the above and other methods of the invention(s) are set forth below. As with any other method steps set forth in this application, the steps set forth below may be carried out on or with the assistance of a control system that includes computer hardware and software, such as the example control system set forth above, in reference to FIG. 2.

In some embodiments, after clean energy is produced by a user who is a wholesale seller of clean energy (as discussed above), the EPB Smart Contract periodically performs a scan of the Wholesalers' Tier Blockchain Subsystem 1105. In some embodiments, such a scan is performed to find all CETs related to clean energy transactions in which the wholesale seller was a party. The EPB Smart Contract also computes a function (which, in some embodiments, may be determined by the wholesale seller and/or a subsystem of system 1101 owned by the wholesale seller) based on scanned information, data and/or values scanned and recorded by the EPB Smart Contract. In some embodiments, if the output of that function satisfies criteria set by the wholesale seller (e.g. exceeds a preset threshold value stored on computer hardware within system 1101) the EPB Smart Contract triggers a communication to a component subsystem of system 1101 including specialized computer hardware and software, such as EPC Computer 1106, remote computer terminal 1107 and/or production controller 1109, which may be owned by the clean energy wholesale seller, in some embodiments. This communication is also illustrated as example communications-indicating arrow 1111. In some embodiments, such a scan may also be performed to find CETs matching other criteria, and basing other analyses and/or functions. For example, in some embodiments, the wholesale seller or the wholesale buyer (or, in some embodiments, any user) may scan the Wholesalers' Tier Blockchain Subsystem 1105 for all CETs related to transactions taking place within a specific timeframe (e.g., the previous year). In some such embodiments, the wholesale seller or the wholesale buyer (or, in some embodiments, any user) may then download data related to all such CETs, and perform analyses on those data (e.g., market analysis) on his or her local computer system, which may be separate from system 1101, in some embodiments. In some embodiments, the EPB Smart Contract is, at least in part, a decentralized software application, performing and/or facilitating such analyses and functions. In some embodiments, however, the EPB Smart Contract is hosted on the Wholesalers' Tier Blockchain Subsystem 1105. In some such embodiments, any authenticated user of system 1101 may access and run the EPB Smart Contract on the Wholesalers' Tier Blockchain Subsystem 1105, even if it is not hosted on that authenticated user's local computer system. In some embodiments, such market analyses may include an analysis of demand for and/or supply of clean energy. For example, in some such embodiments, such an analysis includes a determination of whether an oversupply of clean energy has occurred. As another example, in some such embodiments, such an analysis includes a determination of whether a shortfall of clean energy production has occurred, and demand exceeded supply.

In some embodiments, EPC computer 1106 is associated with a unique public/private cryptographic key pair (a.k.a., a "Controller Identification Key Pair"), which is used for secure channel establishment with an EPB Smart Contract, via a new form of smart contract, known as an "EPC Smart Contract." In some embodiments, such an EPC Smart Contract may be recorded on a blockchain(s) within system 1101, such as blockchain(s) within Wholesalers' Tier Blockchain Subsystem 1105. In some embodiments, such an EPC Smart Contract is created and owned by a wholesale seller. In some embodiments, such an EPC Smart Contract and may be run on the Wholesalers' Tier Blockchain Subsystem 1105. In some embodiments, when executed, such an EPC Smart Contract establishes a secure channel for communications between a local computer system (e.g., the EPC computer) owned by the seller and the EPB Smart Contract. In some embodiments, an EPC Smart Contract, and the secure channel it creates, ensures that data (e.g., parameters) sent by the smart contract to the EPC computer, and vice versa, is securely transmitted (remains confidential) and authentically originates from that EPC computer, thus ensuring that data recorded from such communications are authentic, accurate and/or supporting genuine clean energy transactions, in some embodiments. For example, in some embodiments, such a secure transmission is carried out using a TLS 1.3 protocol. In some embodiments, the EPC computer may control clean energy production (e.g., by connection with and commands issued to controllers controlling clean energy production hardware 1113) based on the smart contract, and/or data recorded by the smart contract. For example, where the smart contract relays data to the EPC computer indicating that the clean energy production hardware 1113 is producing a greater or lower amount than necessary based on clean energy demand, the EPC slows down or increases, respectively, the clean energy production by the clean energy production hardware 1113 owned by wholesale seller/owner 1103.

Figure 12:
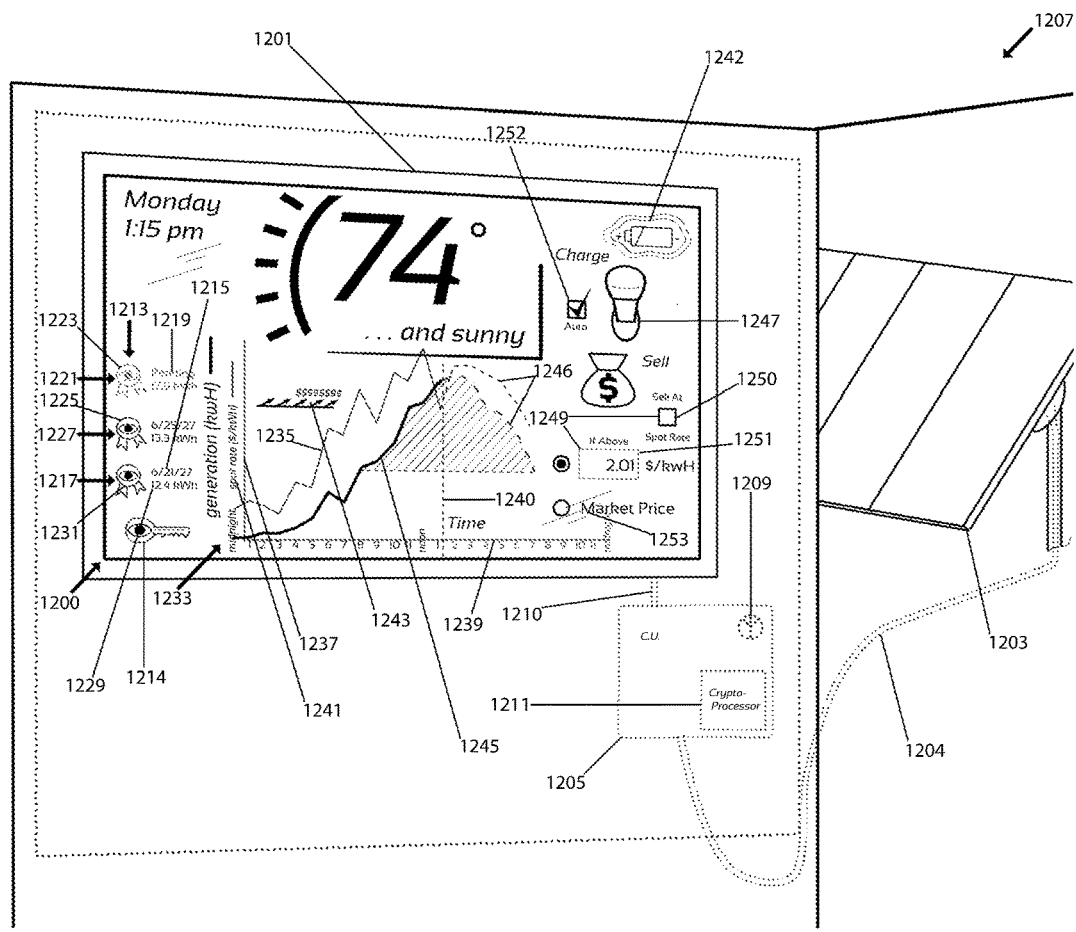
FIG. 12 is a perspective drawing of an example graphical user interface ("GUI") displayed on example computer hardware, configured to permit an owner of preferred energy (e.g., clean energy) generation hardware to carry out techniques set forth in this application, in accordance with some embodiments of the invention.

FIG. 12 is a perspective drawing of an example graphical user interface ("GUI") 1200 displayed on example computer hardware (e.g., example display 1201) and configured to permit an owner of preferred and/or clean energy generation hardware (e.g., example photovoltaic panel 1203) to carry out techniques set forth in this application related to producing and selling verified clean energy, in accordance with some embodiments of the invention. In some embodiments, as with other GUIs connected or associated with energy generation hardware set forth in this application, GUI 1200 and display 1201 are included within or connected with a control system, such as the example control system set forth in FIG. 2, above, including computer hardware and software, and carrying out aspects of the invention related to managing clean energy. In some embodiments, energy produced by such clean energy generation hardware, such as example photovoltaic panel 1203, is managed and routed (e.g., through conductive hardwired electrical connections, such as example electrical connections 1204) and other power routing and control hardware within the control system. In some embodiments, such computer hardware and software, such as example local computer system 1205, may be located, at least in part, on-site at a local clean energy generation facility, such as example local clean energy generation facility 1207, which may be owned by an owner of the clean energy generation hardware. In some embodiments, GUI 1200 and display 1201 may be included within a system for managing an energy supply chain and within, and as a component of, an energy sourcing and distribution environment, such as example system 801, example system 901, example system 1001, and/or example system 1101, as set forth above. In some such embodiments, local computer system 1205 may be connected for communications and control with such a system via communications hardware—for example, via example wireless communications hardware 1209 and/or wired connection 1210. In some embodiments, example local computer system 1205 may be capable of carrying out any of the methodological steps based on specialized computer hardware and software for preventing fraudulent or falsely asserted "preferred energy" or "clean energy" transactions set forth in this application. For example, as with other similar user interfaces set forth in this application, user interface 1200 may be included within a secure metering device ("SMD"), which example computer system 1205 may include, or be included within, in some embodiments. Thus, in some embodiments, computer system 1205 may be such an SMD including computer hardware and software with cryptographic capability(ies), such as example crypto-processor 1211, which may hold one or more public/private key pairs, which key pairs may be used to sign and authenticate transactions related to the production of preferred energy, such as clean energy produced by the clean energy production hardware within clean energy generation facility 1207. Thus, as with other SMDs, computer system 1205 may track and authenticate the production of preferred energy, such as clean energy, in accordance with any of the methods set forth in this application from SMDs. And, in some embodiments, computer system 1205 may create and sign digital certificates related to clean energy, such as Device Identification Certificates and/or Device Transaction Signing Certificates, as discussed above, and authenticate the production of clean energy, which is later sold to buyers in transactions carried out with the aid of the control system and/or the system for managing an energy supply chain of which it is a part. For example, in some embodiments, computer system 1205 may report data regarding the production of clean energy from photovoltaic panel 1203, and record it on a CEP-Tracking subsystem including a blockchain, as discussed in detail elsewhere in this application. Such transactions and certificates may then be managed and controlled by GUI 1200, including by indicators of such certificates, such as example transaction certification indicators 1213, as discussed in greater detail below. In some embodiments, the presence and/or activity of such a public/private key pair within the SMD, e.g., in transactions represented by example transaction certification indicators 613, may be indicated by one or more key pair activity indicators, such as example key activity indicator 1214.

As with other GUI tools and interface aspects set forth in this application, transaction certification indicators 1213 are each preferably presented as a visual indicator on a display, such as example display 1201 in some embodiments, and enable an authenticated user (e.g., the owner of clean energy generation hardware) to track information relevant to the user's activities related to the control system and/or the system for managing an energy supply chain of which it is a part. However, in some embodiments, transaction certification indicators 1213 may be presented in other and/or additional forms, including, but not limited to, audible indicator, tactile indicator, and/or haptic indicator forms. In some embodiments, transaction certification indicators 1213 may take on different visual forms to indicate the current, changing or changed status of particular energy-related transactions carried out by the user, e.g., in some embodiments, such transactions being carried out using other aspects of GUI 1200, as will be discussed in greater detail below. For example, and as will be discussed further below, in some embodiments, such a user, who is also the owner of clean energy generation hardware, may decide to sell clean energy generated by his or her clean energy generation hardware (e.g., photovoltaic panel 1203) in one or more clean energy transaction(s) carried out with the aid of the control system and/or the system for managing an energy supply chain of which it is a part. As discussed in greater detail elsewhere in this application, in some embodiments, such a system for managing an energy supply chain may include a CEP-Tracking subsystem, including one or more blockchain(s), on which information related to such clean energy transactions is recorded on such blockchain(s), and digitally signed with one or more public/private key pairs held in local computer system 1205 (e.g., within cryptoprocessor 1211). As discussed above, in some embodiments, example local computer system 1205 is an SMD, and therefore holds such public/private key pairs. In some embodiments, such digitally-signed information includes the amount of energy produced by the clean energy generation hardware and sold in a clean energy transaction(s) with another user (a buyer) of the system for managing an energy supply chain, via the system for managing an energy supply chain. In some embodiments, such digitally-signed information includes the time that transaction took place. In some embodiments, such digitally-signed information includes whether the transaction is pending, or has been completed. In some embodiments, such digitally-signed information includes the identities of the parties to the transaction. In some embodiments, as discussed above, digital certificates are issued by local computer system 1205, associated with such clean energy transactions, digitally signed by the public/private key pairs, and recorded on the CEP-Tracking subsystem, along with any of these data (discussed above in this paragraph). In some embodiments, one or more aspects of the transaction certification indicators 1213 may indicate any of those data, or aspects related to those data. For example, in some embodiments, transaction certification indicators 1213 indicate the date that a transaction was executed with a date and/or time sub-tool or aspect, such as example date and time sub-indicator 1215 of example transaction certification indicator 1217. As another example, in some embodiments, one or more of transaction certification indicators 1213 may indicate the status of the transaction as pending, rather than completed, with a status-indicating sub-indicator, such as example status-indicating sub-indicator 1219, which states in writing whether the transaction(s) represented by example transaction certification indicator 1221 is "Pending." In some embodiments, different or multiple such sub-indicators may be implemented. For example, in some embodiments, a second status-indicating sub-indicator 1223 may be a faded, or differently-colored or patterned visual effect, as pictured, indicating that a transaction(s) represented by example transaction certification indicator 1221 is pending (i.e., has not been fully consummated or settled, with payment of money or other consideration required from the buyer in the transaction and/or a related contract.) Conversely, another example of a status-indicating sub-indicator is a bolder appearance, different color (e.g., green), or different pattern than status-indicating sub-indicator 1223, such as example bolder appearance 1225, indicating that a transaction(s) represented by example transaction certification indicator 1227 is/are not pending and, instead, has/have been completed. As another example of a status-indicating sub-indicator, in some embodiments, transaction certification indicators 1213 indicate the amount of energy subject to a transaction(s) represented by each such example transaction certification indicator, with a power amount-indicating sub-indicator, such as example power amount-indicating sub-indicator 1229, which states such an amount of power (e.g., in writing). As another example of a status-indicating sub-indicator, in some embodiments, transaction certification indicators 1213 indicate that energy traded in a transaction(s) represented by each such example transaction certification indicator is authenticated clean energy and/or associated with one or more digital certificates related to clean energy, such as a Device Transaction Signing Certificate, through a certification-indicating sub-indicator, such as example certification-indicating sub-indicator 1231, which may be in the form of a conventional seal or certificate, in some embodiments (as pictured).

In some embodiments, specialized tools are presented within GUI 1200 to facilitate a user (e.g., the owner of the clean energy generation hardware) selling and determining when to sell clean energy generated by that clean energy generation hardware (e.g., photovoltaic panel 1203). For example, in some embodiments, a GUI sub-tool tracks recently-executed trading prices (e.g., prices achieved in U.S. Dollars per unit of power), such as a latest-price-indicating GUI sub-tool. One such sub-tool, in some embodiments, is shown as example real-time price-tracking chart 1233, which exhibits such prices as a plotted line 1235 of dollar amounts of transactions, along example Y axis 1237, over time, along example X axis 1239. In some embodiments, such prices may be available "spot rates" for energy, on an energy trading market, as indicated by example plot-label indicator 1241. In some embodiments, such prices may be rates based on transactions tracked by the system for managing an energy supply chain of which local computer system 1205 and GUI 1200 are a part, as set forth above in this application. In some embodiments, such prices may be available price(s) for the sale of energy through the system for managing an energy supply chain. For example, in some such embodiments, such available prices are based on bids for the purchase of energy, created on the system for managing an energy supply chain by other users thereof who are buyers of energy (such as clean energy). As another example, in some such embodiments, such available prices are based on asks for the sale of energy, created on the system for managing an energy supply chain by users thereof who are buyers of energy (such as clean energy). In some embodiments, a specialized GUI sub-tool may indicate, based on the cost for the owner of developing and/or operating the clean energy generation hardware (e.g., example photovoltaic panel 603) and/or based on the cost of purchasing energy from an energy grid to which the clean energy generation hardware is connected, whether such a currently available price is profitable, or optimally profitable for the seller/owner of photovoltaic panel 1203. For example, in some embodiments, one such GUI tool is a profitability-indicating line (shown as optimal price level indication GUI tool 1243), placed at the vertical level along example Y axis 1237 indicating a level above which such an available price level is considered to be profitable or, in some embodiments, optimal. In some embodiments, such available prices may be considered optimal if they are above a level indicated as at a level higher than is likely to be achieved again within a certain time frame. For example, in some embodiments, such available prices may be considered optimal if they are above a level indicated as at a level higher than is likely to be achieved again within one day. As another example, in some embodiments, such available prices may be considered optimal if they are above a level indicated as at a level higher than is likely to be achieved again within one week, or another, shorter or longer time period. As yet another example, in some embodiments, such available prices may be considered optimal if they are above a level indicated as at a level higher than is likely to be achieved again before a reserve of power is likely to be depleted by use (e.g., a battery storage pack held within control system 1205, with a level of stored power indicated, for example, by battery level indicator 1242). To indicate such a profitable or optimal price level, therefore, example profitable or optimal price level indicating GUI tool 1243 is provided. In some embodiments, another GUI tool in the form of a line or other plot is provided as part of real-time price-tracking chart 1233, such as example energy generation tracking line 1245. In some embodiments, example energy generation tracking line 1245 plots the amount of energy generated by all energy producers and provided, and/or sold, through the system for managing an energy supply chain, along the Y axis 1237, over time, along the X axis 1239. In some embodiments, any such plots discussed above may take on another visual form, representing projections of such prices or generation amounts at a future time (e.g., based on historic, daily trends, and present trends), as shown by example dashed projection-indicating lines 1246. In some embodiments, projection-indicating sub-tools of GUI 1200, such as example dashed projection-indicating lines 1246, are created to the right-hand-side of a present time indicator, such as example present time indicating vertical line 1240.

In some embodiments, a user may directly select, at any time, whether to sell energy generated by his or her clean energy generation hardware (such as photovoltaic panel 1203) through control system 1205 and the system for managing an energy supply chain of which it is a part. For example, in some embodiments a charging/selling switch GUI tool 1247, is provided. In some embodiments, charging/selling switch GUI tool 1247 is in the visual form of a toggle switch which, when selected by the user (e.g., by pressing, or swiping his or her finger vertically, in the event that display 1201 is a touch screen), can be switched to and from: 1) a first, upward vertical position (as pictured) indicating that energy generated by the clean energy generation hardware is currently being stored locally, within control system 1205 and/or energy generation facility 1207; and 2) a second, downward vertical position indicating that energy generated by the clean energy generation hardware is currently being sold and exported to buyers of the energy, remote from energy generation facility 1207 (but on and/or through the system for managing an energy supply chain). In some embodiments, the user may further select, in the event of placing GUI tool 1247 into the second, downward vertical position, a price at which the energy generated by the clean energy generation hardware will be so sold, for example, with conditional, limit-indicating sale price selection tools 1249. For example, in some embodiments, a user may select to sell clean energy at the current spot rate, or other available rate, with spot-rate sale selection tool 1250. As another example, a user may also select to so sell clean energy at the current spot rate, or other available rate, but only on the condition that the current spot rate meets or exceeds a preset price level, (e.g., a profitable price level, as discussed herein; and/or, e.g., an optimal price level, as discussed herein) by entering such a price level in price level data entry window 1251, in some embodiments. As another example, in some embodiments, a user may cause the control system 1205 to provide such a profitable price and/or optimal price and cause the computer system to so sell clean energy when a currently available rate (e.g. spot rate) exceeds such a price, or, if not, to switch to charging a battery or other local energy storage device within clean energy generation facility 1207, e.g., by selecting automatic dynamic selling tool 1252. However, in other embodiments, a user may manually or otherwise provide a price level, above which the computer system 1205 will sell clean energy generated by the clean energy generation facility 1207 (and beneath which, the computer system will so charge such a local energy storage device). For example, as pictured, the user has entered the price level "$2.01" in price level data entry window 1251, in the example pictured. Thus, with such selections of conditional, limit-indicating sale price selection tools 1249, if and when such a presently available price exceeds $2.01, the control system 1205 will execute transactions selling clean energy generated by local clean energy generation facility 1207, but not at lower price levels, to buyers of clean energy through the system for managing an energy supply chain, if available.

By contrast, in some embodiments, the owner of the clean energy generation hardware may instead select market price sale selection tool 1253, which, when selected, will instead cause the control system 1205 to execute transactions selling clean energy generated by local clean energy generation facility 1207 at the then-prevailing, highest-available market price.

Figure 13:
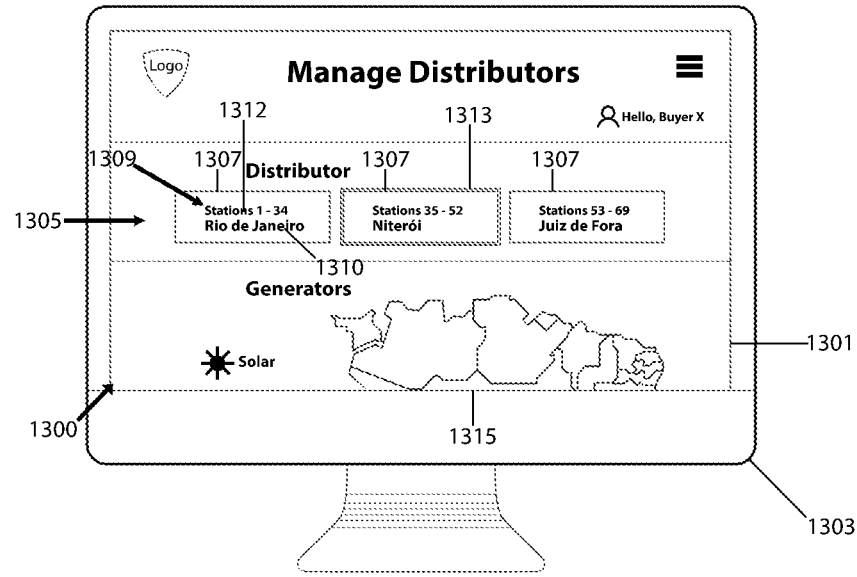
FIG. 13 is a front view of another example graphical user interface ("GUI") on example computer hardware, configured to assist a buyer of clean energy to carry out techniques set forth in this application, in accordance with some embodiments of the invention.

FIG. 13 is a front view of another example graphical user interface ("GUI") 1300 configured to assist a buyer of verified clean energy to carry out techniques set forth in this application, in accordance with some embodiments of the invention. In some embodiments, as with other GUI's connected or associated with energy generation hardware set forth in this application, GUI 1300 and example computer display 1301, on which it is rendered, are included within or connected with a control system, such as the example control system set forth in FIG. 5, above, including computer hardware and software, and carrying out aspects of the invention related to managing a supply of particular types of energy, such as clean energy. In some embodiments, such computer hardware and software may be located, at least in part, on-site at facilities owned by such a clean energy buyer, and may also be owned by such a clean energy buyer. As with other example GUI's set forth in this application, in some embodiments, GUI 1300 and display 1301 may be included within a system for managing an energy supply chain and within, and as a component of, an energy sourcing and distribution environment, such as example system 801, example system 901, example system 1001, and/or example system 1101, as set forth above. As pictured, in some embodiments, example GUI 1300 may be rendered, and include actuable tools (e.g., on a touchscreen) through a local computer system, such as example computer system 1303, which may include display 701, in some embodiments.

In some embodiments, GUI 1300 may include GUI tools aiding a user in selecting and managing sources of energy provided to the user's on-site facilities (not pictured) for consumption, storage and/or re-distribution. For example, in some embodiments, an energy source distributor selection GUI tool 1305 is provided. In some embodiments, energy source selection GUI tool 1305 includes a series of selection sub-tools, such as example selection option buttons 1307, each of which represents an option for an energy distributor (e.g., a different wholesale energy distributor). In some embodiments, each of those selection sub-tools include descriptive information, such as the example descriptive information 1309. In some embodiments, such descriptive information includes the geographic location (shown in geographic region indicating sub-tool 1310) and/or the number of a particular type of facility (e.g., energy providing "stations," as indicated in facility type indicating sub-tool 1312) related to the wholesale distributor represented by the sub-tool, as pictured. In some embodiments, the user may select any of the example selection option button(s) corresponding with any of those distributors, e.g., by "clicking on" them, e.g., using a pointer, controlled by a computer mouse (not pictured) of computer system 1303, after which energy is sourced and purchased through the system for managing an energy supply chain and delivered to the user's on-site at facilities. In some embodiments, such a selection status is indicated by a GUI sub-tool, such as example selection-highlighting button border 1313, associated with the selected by the selected button(s) (among example selection option buttons 1307).

In some embodiments, the entire GUI 1300 may not be visible at one time on computer display 1301. Instead, in some such embodiments (as pictured), a user must "scroll," or otherwise select new areas, pages or features for display, or otherwise explore and navigate through additional aspects of the GUI 1300 with additional actuation of computer system 1303 and/or GUI 1300. For example, GUI 1300 is pictured as partially cut off from view, at the bottom 1315 of display 1301, in the present figure. Rather than display all such navigation options, the following figure will display a larger rendering of GUI 1300, without regard to any particular computer display on which it may be presented.

Figure 14:
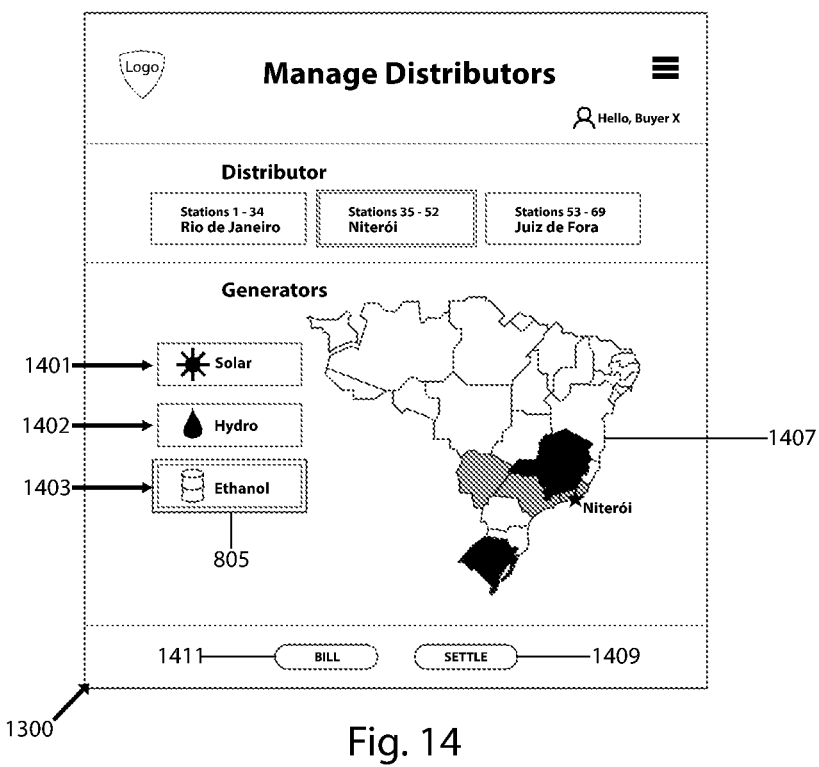
FIG. 14 is a front view of the same example graphical user interface ("GUI") on example computer hardware set forth in FIG. 7, in a more complete rendering, in accordance with some embodiments of the invention.

FIG. 14 is a front view of the same example graphical user interface ("GUI"), shown previously on example computer hardware set forth in FIG. 13, in a larger, more complete rendering, in accordance with some embodiments. As mentioned above, this larger rendering of GUI 1300 allows additional aspects of GUI 1300 to be viewed simultaneously. For example, previously obscured from view, but now visible in the present figure, are a number of additional GUI tools and sub-tools related to selecting one or more type(s) of energy, available for purchase by the buyer. For example, three example energy type selection tools, including energy type selection button 1401, energy type selection button 1402, and energy type selection button 1403, are provided in GUI 1300, and shown in the present figure. For example, energy type selection button 1401 allows the buyer to select solar energy as a source of energy to be purchased with the aid of the control system, and the system for managing an energy supply chain of which it may be a part, in some embodiments. As another example, energy type selection button 1402 allows the buyer to select hydrological energy as a source of energy to be purchased with the aid of the control system, and the system for managing an energy supply chain of which it may be a part, in some embodiments. And as another example, energy type selection button 1403 allows the buyer to select ethanol as a source of energy to be purchased with the aid of the control system, and the system for managing an energy supply chain of which it may be a part, in some embodiments. In some embodiments, the selection of such energy types with selection tools is indicated by a GUI sub-tool, such as example selection-highlighting button border 1405, which may be associated with the energy type selection button(s) when actuated.

In some embodiments, geographic regions and facilities may be indicated by a GUI tool in the form of a map, such as example map 1407, which may present any geographic region from which any such energy may be available for purchase. In some such embodiments, such regions may be shown on map 1407 with a distinct shading, color or other visual indicator, to demonstrate the availability of that region as an energy source location. In some embodiments, regions may be shown on map 1407 with another distinct shading, color or other visual indicator, to demonstrate the selection of that region as an energy source location.

In some embodiments, such a buyer may execute energy trading with the aid of GUI 1300, and sub-aspects of such energy trading, such as settling such transactions (e.g., with the aid of a transaction settlement GUI sub-tool 1409) or billing additional buyers, which the buyer may then sell energy or excess energy to (e.g., with the aid of a billing facilitating GUI sub-tool 1411).

Figure 15:
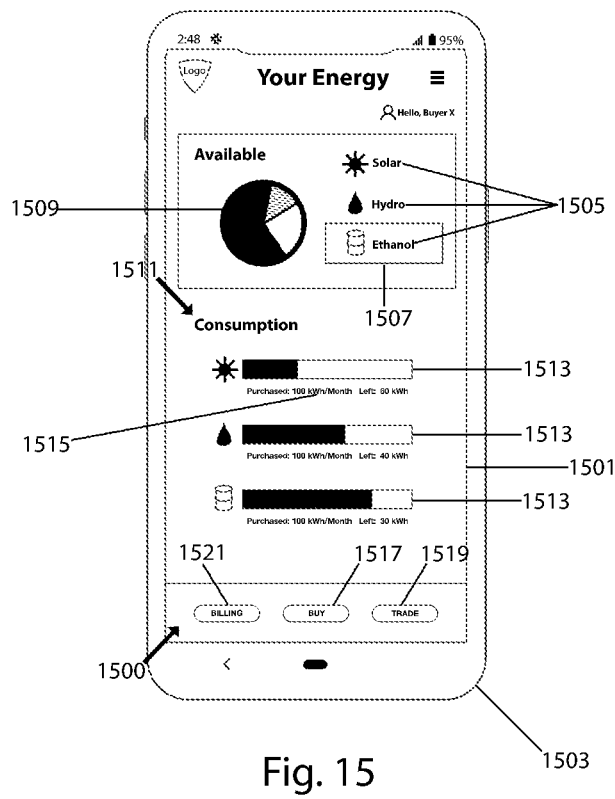
FIG. 15 is a front view of another example graphical user interface ("GUI") on example computer hardware of a smartphone device, configured to assist a buyer of clean energy to carry out techniques set forth in this application, in accordance with some embodiments of the invention.

FIG. 15 is a front view of another example graphical user interface ("GUI") 1500 on example computer hardware of a smartphone device, configured to assist a buyer of clean energy to carry out techniques set forth in this application, in accordance with some embodiments of the invention. In some embodiments, as with other GUI's connected or associated with energy generation hardware set forth in this application, GUI 900 and example touchscreen display 1501, on which it is rendered, are included within or connected with a control system, such as the example control system set forth in FIG. 5, above, including computer hardware and software, and carrying out aspects of the invention related to managing a supply of particular types of energy, such as clean energy. In some embodiments, such computer hardware and software may be located, at least in part, on-site at facilities owned by such a clean energy buyer (e.g., within a portable PDA), and may also be owned by such a clean energy buyer. As with other example GUIs set forth in this application, in some embodiments, GUI 1500 and display 1501 may be included within a system for managing an energy supply chain and within, and as a component of, an energy sourcing and distribution environment, such as example system 801, example system 901, example system 1001, and/or example system 1101, as set forth above. As pictured, in some embodiments, example GUI 1500 may be rendered, and include actuable tools (e.g., on a touchscreen) through a local computer system, such as example handheld smartphone 1503, which may include display 901, in some embodiments. Of course, the pictured embodiment of a smartphone, or any other particular computerized device, for rendering GUI's set forth in the present application are just some possibilities, among innumerable options for rendering and/or implementing the GUI techniques set forth herein, as will be readily apparent to those of ordinary skill in the art.

In some embodiments, GUI 1500 includes some similar features and aspects as set forth in other example GUI's of this application. For example, on the top right-hand side of the figure, example energy type selection tools 1505 are provided, which may be actuated by the user to select one or more type(s) of energy, available for purchase by the buyer. As with energy type selection tool 1401, energy type selection tool 1402, and energy type selection tool 1403, discussed above, energy type selection tools 1505 may each indicate when they have been actuated, and the type of energy described therein is supplied to the buyer, e.g., with a GUI sub-tool, such as example selection-highlighting button border 1507, associated with the selected energy type selection tool(s).

In some embodiments, GUI 900 may also include a proportion-indicating graphical tool 1509, indicating the proportion of energy which may be sourced by the buyer from each of the one or more type(s) of energy available (e.g., as those options are indicated by the energy type selection tools 1505). In some such embodiments, as pictured, such a proportion-indicating graphical tool 1509 may indicate the percentage of each source of energy which has been purchased by the buyer. In some such embodiments, as pictured, such a proportion-indicating graphical tool 1509 may indicate the percentage of each source of energy which is available to be purchased by the buyer.

In some embodiments, GUI 1500 may include volume-measuring graphical tool(s) 1511, which display the amounts of each such type of energy purchased and/or consumed by the buyer. In some embodiments, volume-measuring graphical tool 1511 includes graphically representative, scaled sub-features 1513, displaying a visible measure of such amounts. In some embodiments, however, volume-measuring graphical tool(s) 1511 include written description sub-features, such as the example written description sub-feature 1515, stating such amounts in units (e.g., as pictured, kWh and kWh/month).

In some embodiments, the buyer may execute energy trading with the aid of GUI 1500, and sub-aspects of such energy trading, such as executing orders to buy energy in the amounts or portions indicated by GUI 1500, using example energy buying execution tool 1517 (e.g., in the form of an actuable button, on the touchscreen display 1501 of smartphone 1503). In some embodiments, the buyer may further trade energy, for example, by reselling energy the buyer has purchased, using another tool(s) of GUI 1500. For example, in some embodiments, the buyer may actuate energy trading tool 1519, to trade (e.g., resell) such energy it has purchased. In some such embodiments, any certificates set forth in this application may be read from one or more blockchain(s) of the system for managing an energy supply chain of which smartphone 1503 is a part, to authenticate and/or verify whether the energy being purchased and/or further traded, are clean energy, or another type of energy. In some embodiments, the buyer may bill further trading partners, e.g., to whom the buyer has sold energy to, with the aid of a billing facilitating GUI sub-tool 1521.

As with GUI 1400 with regard to computer system 1403's display 1401, discussed above, in some embodiments, the entire GUI 1500 may not be visible at one time on computer display 1501 of smartphone 1503, in some embodiments. Instead, in some such embodiments, a user must "scroll," or otherwise select new areas, pages or features for display, or otherwise explore and navigate through additional aspects of the GUI 1500 with additional actuation of computer system 1503 and/or GUI 1500. Rather than display all such navigation options, the following figure will display such additional features and/or aspects of GUI 1500, without regard to any particular computer display on which it may be presented.

Figure 16:
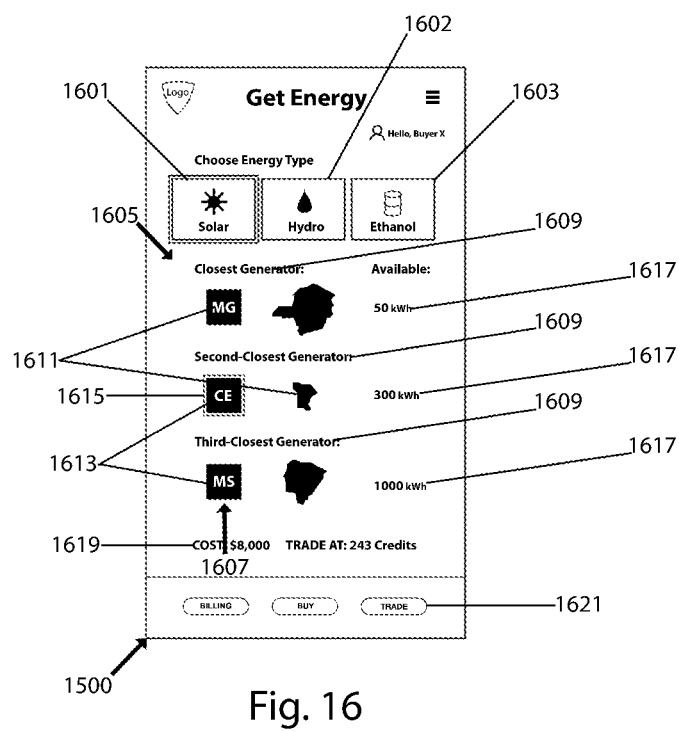
FIG. 16 is a front view of the same example graphical user interface ("GUI") on example computer hardware set forth in FIG. 9, in a more complete rendering, in accordance with some embodiments of the invention.

FIG. 16 is a front view of additional aspects of graphical user interface ("GUI") 1500, apart from any particular display or other computer hardware set forth in FIG. 15, in accordance with some embodiments of the invention. In some embodiments, the buyer may have navigated to the additional aspects pictured, for example, by making selections (e.g., by touching actuable areas of the touchscreen display), within the form of GUI 1500 pictured previously, and/or via navigation tools provided on smartphone 1503. In some embodiments, the additional features of GUI 1500 set forth in the present figure may be presented as a default page or other presentation of GUI 1500, upon a user booting or "starting up" smartphone 1503, or a software application run on smartphone 1503. In any event, in some embodiments, such additional features, as pictured, of GUI 1500 include a variety of more specific functions related to functions presented previously, above. For example, whereas GUI 1500 was previously pictured as including example energy type selection tools 1505, and similar energy selection tools, including energy type selection tool 1601, energy type selection tool 1602, and energy type selection tool 1603, are included in the form of GUI 1500 now pictured, additional, more specific energy type selection tools, and sub-features thereof, are now also pictured.

For example, in some embodiments, GUI 1500 also includes a geographical proximity-indicating sub-tool 1605. In some embodiments, geographical proximity-indicating sub-tool 1605 includes a ranked listing 1607 of each energy production facility that is available to supply energy of a type selected by the buyer for purchase. In some embodiments, such a ranked listing 1607 includes a listing of each such facility, from nearest to farthest geographic location, in comparison to the geographic location of the buyer. In some embodiments, such a ranked listing 1607 includes location-indicating GUI sub-tools 1609, indicating the location of each such energy production facility. In some embodiments, such a ranked listing 1607 includes identity-indicating GUI sub-tools, such as the example identity-indicating sub-tools 1611, indicating one or more unique identifier(s) of each such energy production facility. In some embodiments, such a ranked listing 1607 includes a plurality of selection buttons, such as example selection buttons 1613, each associated with a listed energy production facility, which, when actuated by the user, cause energy purchased by the buyer to be sourced from that listed energy production facility. In some embodiments, such a selection may be indicated by a selection indicator, e.g., a GUI sub-tool, such as example selection-highlighting button border 1615.

In some embodiments, such a ranked listing 1607 includes energy production capacity-indicating GUI sub-tools 1617, each indicating the energy production capacity (e.g., in available kWh) of each energy production facility listed. As discussed above, in some embodiments, GUI 1500 includes trading facilitating features, several of which appear in the pictured embodiments. In addition to such trading features discussed previously, in some embodiments, a cost estimator or price indicating GUI sub-tool 1619 may be included in GUI 1500. In some embodiments, such a cost estimator or price-indicating GUI sub-tool 1619 states an estimated cost or price of obtaining energy selected from a selected energy production facility (selected with the aid of GUI 1500, as discussed herein). In some embodiments, users such as a buyer using GUI 1500, may make purchases and/or other transactions in energy from energy production facilities when selected (e.g., using ranked listing 1607) without the use of money. For example, in some embodiments, such as those in which "cap-and-trade" energy regulations for clean energy apply to energy buyers, a buyer may earn non-monetary credits from past use of clean energy, or from other sources. In some embodiments, a buyer may trade such credits, using credit trading facilitation tool 1621, to execute energy transactions using GUI 1500, and counterparty(ies) to such transactions with the buyer may earn such credits, through the system for managing an energy supply chain. As mentioned above, some such credits may be Clean Energy Tokens, issued from a blockchain(s) within the system for managing an energy supply chain. As also mentioned above, in some embodiments, such Clean Energy Tokens may be based on digital certificates, such as any of the digital certificates set forth in this application.

What is claimed is:

1. A method for managing an energy supply chain and preventing falsely asserted clean energy transactions, comprising the following steps:
    connecting, by a control system comprising a user interface, with one or more distributed ledger(s) and one or more preferred energy source(s) comprising preferred energy generation hardware;

wherein the control system comprises computer hardware, software and a secure metering device (SMD), and wherein the SMD comprises a crypto-processor and a tamper-resistant housing enveloping said crypto-processor; and recording, by the control system comprising the user interface, on said one or more distributed ledger(s) data related to preferred energy transactions between at least one buyer of preferred energy and at least one seller of preferred energy;

monitoring, with the aid of the SMD, a report on an amount of energy by at least one of the one or more preferred energy source(s);

generating, with the aid of the SMD, a report on an amount of energy produced by at least one of the one or more preferred energy source(s);

generating, with the aid of the SMD, at least one unique device identification key pair(s);

storing said at least one unique device identification key pair(s) only on hardware the SMD; and preventing, with the aid of the SMD, the reading, copying or removal of the at least one unique device identification key pair(s), while other data held within said SMD is removable from said SMD.

2. The method for managing an energy supply chain and preventing falsely asserted clean energy transactions of claim 1, wherein said control system includes, or is communicatively connected with, at least one blockchain(s).

3. The method for managing an energy supply chain and preventing falsely asserted clean energy transactions of claim 1, wherein said preferred energy is clean energy.

4. The method for managing an energy supply chain and preventing falsely asserted clean energy transactions of claim 1, wherein the control system is configured to create and record a reserve preferred energy promissory token, related to a planned future transaction in preferred energy.

5. The method for managing an energy supply chain and preventing falsely asserted clean energy transactions of claim 1, wherein the control system is configured to execute and record at least some of said data related to preferred energy transactions on said one or more distributed ledger(s) using at least one smart contract(s).

6. The method for managing an energy supply chain and preventing falsely asserted clean energy transactions of claim 5, wherein the control system is configured to create at least one smart contract(s) linking at least one unique public key of said at least one unique device identification key pair(s) with a different unique public key of another asymmetric cryptography key pair held exclusively by, and uniquely identifying, an owner of said preferred energy generation hardware.

7. The method for managing an energy supply chain and preventing falsely asserted clean energy transactions of claim 1, wherein said at least one unique device identification key pair(s) uniquely identifies said SMD.

8. The method for managing an energy supply chain and preventing falsely asserted clean energy transactions of claim 6, wherein said at least one smart contract(s) is digitally signed by a third party, other than said seller of preferred energy and said buyer of preferred energy.

9. The method for managing an energy supply chain and preventing falsely asserted clean energy transactions of claim 6, wherein said seller of preferred energy is said owner of said preferred energy generation hardware.

10. The method for managing an energy supply chain and preventing falsely asserted clean energy transactions of claim 1, wherein said SMD is physically attached to said preferred energy generation hardware.

11. The method for managing an energy supply chain and preventing falsely asserted clean energy transactions of claim 1, wherein said SMD is physically integrated with said preferred energy generation hardware.

12. The method for managing an energy supply chain and preventing falsely asserted clean energy transactions of claim 1, wherein said tamper-resistant housing comprises tamper-resistant and tamper-evident packaging.

13. The method for managing an energy supply chain and preventing falsely asserted clean energy transactions of claim 12, wherein said tamper-resistant housing and/or said tamper-evident packaging comprises a tampering sensor and wherein said control system specifically deletes said at least one unique private key of at least one of said at least one unique device identification key pair(s), and does not delete said other data held within said SMD, based on a communication from said tampering sensor.

14. The method for managing an energy supply chain and preventing falsely asserted clean energy transactions of claim 13, wherein said communication from said tampering sensor is related to tampering based on an application of an algorithm comparing said communication from said tampering sensor to data stored in a memory device of said system.

15. The method for managing an energy supply chain and preventing falsely asserted clean energy transactions of claim 6, wherein said control system is configured to create and record another smart contract, which is a clean source verification smart contract, on at least one of said distributed ledger(s), and wherein said clean source verification smart contract comprises a function for looking up clean energy related transactions.

16. The method for managing an energy supply chain and preventing falsely asserted clean energy transactions of claim 15, wherein the control system is configured to track clean energy generation (CEG) transactions with the aid of clean energy tokens; and wherein said clean energy tokens are recorded on said one or more distributed ledger(s).

17. The method for managing an energy supply chain and preventing falsely asserted clean energy transactions of claim 16, wherein said control system determines an amount of clean energy available for purchase from said owner, based on information provided in said clean energy tokens.

18. The method for managing an energy supply chain and preventing falsely asserted clean energy transactions of claim 17, wherein said control system creates at least one energy production balancing (EPB) smart contract.

19. The method for managing an energy supply chain and preventing falsely asserted clean energy transactions of claim 1, wherein said control system is at least partially managed by a governing body, and wherein said control system is configured to facilitate said governing body creating at least one unique governance smart contract(s).

* * * * *